(12) United States Patent
Deily et al.

(10) Patent No.: US 10,775,898 B2
(45) Date of Patent: Sep. 15, 2020

(54) LOW-PROFILE INPUT DEVICES

(71) Applicant: Microsoft Technology Licensing, LLC, Redmond, WA (US)

(72) Inventors: Michael Francis Deily, Bellevue, WA (US); Michael Gordon Oldani, Redmond, WA (US); Yajing Liu, Redmond, WA (US); David Paul Platt, North Bend, WA (US); David Michael Lane, Sammamish, WA (US); Thomas Joseph Longo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/979,024

(22) Filed: May 14, 2018

(65) Prior Publication Data

US 2019/0235637 A1    Aug. 1, 2019

Related U.S. Application Data

(60) Provisional application No. 62/624,043, filed on Jan. 30, 2018.

(51) Int. Cl.
*G06F 3/02* (2006.01)
*G06F 1/16* (2006.01)
*H01H 13/70* (2006.01)

(52) U.S. Cl.
CPC .......... *G06F 3/0202* (2013.01); *G06F 1/1662* (2013.01); *G06F 1/1669* (2013.01); *H01H 13/70* (2013.01)

(58) Field of Classification Search
CPC ..... G06F 1/1662; G06F 1/1669; G06F 3/0202
See application file for complete search history.

(56) References Cited

U.S. PATENT DOCUMENTS 5,358,344 A   10/1994  Spence
5,763,841 A    6/1998  Hasunuma
(Continued)

FOREIGN PATENT DOCUMENTS

CN      2548245 Y    4/2003
CN    102890560 A    1/2013
EP      1918953 A1   5/2008

OTHER PUBLICATIONS

"International Search Report and Written Opinion Issued in PCT Application No. PCT/US19/012011", dated Jun. 19, 2019, 22 Pages.

*Primary Examiner* — Chun-Nan Lin
(74) *Attorney, Agent, or Firm* — Ray Quinney & Nebeker P.C.; Paul N. Taylor

(57) ABSTRACT

Low-profile keysets and input devices having such low-profile keysets are described. In one example, the input device includes a support structure having a first and second surface; a bezel having a first and second surface, wherein the first surface of the bezel is adjacent to the first surface of the support structure, and the bezel comprises at least one opening; at least one key cap positioned within the at least one opening of the bezel, wherein each key cap is configured to move between a first and second position to trigger a function of the input device; and a fabric cover layer positioned adjacent to the second surface of the bezel, such that the bezel and the at least one key cap are positioned between the fabric cover layer and the support structure, the fabric cover layer is only adhered to the second surface of the bezel.

20 Claims, 15 Drawing Sheets

(56) References Cited

U.S. PATENT DOCUMENTS

| | | | |
|---|---|---|---|
| 6,027,267 | A | 2/2000 | Yokobori |
| 6,153,844 | A | 11/2000 | Hyono |
| 6,940,030 | B2 | 9/2005 | Takeda |
| 8,586,884 | B2 | 11/2013 | Voli et al. |
| 8,742,275 | B1 * | 6/2014 | Lam .................... H01H 13/705 200/516 |
| 9,111,700 | B2 | 8/2015 | Liu et al. |
| 9,123,485 | B2 | 9/2015 | Niu et al. |
| 9,418,798 | B2 | 8/2016 | Nakatani |
| 9,430,050 | B2 | 8/2016 | Peterson et al. |
| 9,490,087 | B2 | 11/2016 | Krumpelman et al. |
| 9,761,389 | B2 | 9/2017 | Leong |
| 2003/0222536 | A1 * | 12/2003 | Morton ................. H01H 13/70 310/317 |
| 2011/0051348 | A1 * | 3/2011 | Song ................ G02F 1/133308 361/679.26 |
| 2011/0248920 | A1 | 10/2011 | Larsen |
| 2012/0092263 | A1 * | 4/2012 | Peterson ................ G06F 3/016 345/168 |
| 2012/0299832 | A1 | 11/2012 | Peterson et al. |
| 2015/0270073 | A1 | 9/2015 | Yarak et al. |
| 2016/0049266 | A1 | 2/2016 | Stringer et al. |
| 2016/0334835 | A1 | 11/2016 | Tamura |
| 2017/0004937 | A1 * | 1/2017 | Leong ................... G06F 3/0202 |
| 2017/0060190 | A1 | 3/2017 | Hegde et al. |
| 2017/0125186 | A1 | 5/2017 | Lin et al. |
| 2017/0358407 | A1 | 12/2017 | Wang |

\* cited by examiner

LOW-PROFILE INPUT DEVICES

CROSS-REFERENCE TO RELATED APPLICATIONS

This application claims the benefit of U.S. Provisional Patent Application No. 62/624,043, filed Jan. 30, 2018, herein incorporated by reference in its entirety.

BACKGROUND

Current design trends for input devices for electronic devices such as tablet computers, laptop computers, desktop computers, or display devices include designs having a decrease in size (e.g., height, length, and/or width). As the size (in particular, the stack height or thinness) of the input device is reduced, certain internal device components may be positioned closer together. This provides for challenges in manufacturing design.

For example, in certain commercial examples, input keys for an input device have a scissor keyset design. These keysets use scissor mechanisms to control the motion of the keys such that the keys remain horizontal when depresses, no matter where the keys are pressed or struck by a user. In some examples, the height or thinness of the input device is constrained by the use of such a scissor keyset design.

SUMMARY

Low-profile keysets and input devices having such low-profile keysets are described herein. In one or more embodiments, an input device includes a support structure having a first surface and a second surface. The input device further includes a bezel having a first surface and a second surface, wherein the first surface of the bezel is adjacent to the first surface of the support structure, and wherein the bezel comprises at least one opening. The input device further includes at least one key cap positioned within the at least one opening of the bezel, wherein each key cap is configured to move between a first position and a second position to trigger a function of the input device. The input device further includes a fabric cover layer positioned adjacent to the second surface of the bezel, such that the bezel and the at least one key cap are positioned between the fabric cover layer and the support structure, wherein the fabric cover layer is only adhered to the second surface of the bezel and not the at least one key cap.

In another embodiment, an input device includes a support structure; a key plate having at least one key, wherein each key is a polygon having a plurality of edges, wherein all but one edge of the plurality of edges is a slit in the key plate and the one edge provides a hinge upon which the key is configured to rotate between a first position and a second position; and at least one switch positioned between the support structure and the key plate, wherein the at least one switch is configured to trigger a function of the input device when the key rotates from the first position to the second position.

In another embodiment, the input device includes a support structure; at least one input key; and at least one switch positioned between the support structure and the input key, wherein the at least one switch is configured to trigger a function of the input device when the input key moves between a first position and a second position. The stack height of the input device is less than 2.5 mm, as measured in a direction from a surface of the input key to the support structure, perpendicular to the surface of the input key. Additionally, the travel distance of the input key between the first position and the second position is at least 0.5 mm, as measured in the direction from the surface of the input key to the support structure, perpendicular to the surface of the key plate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
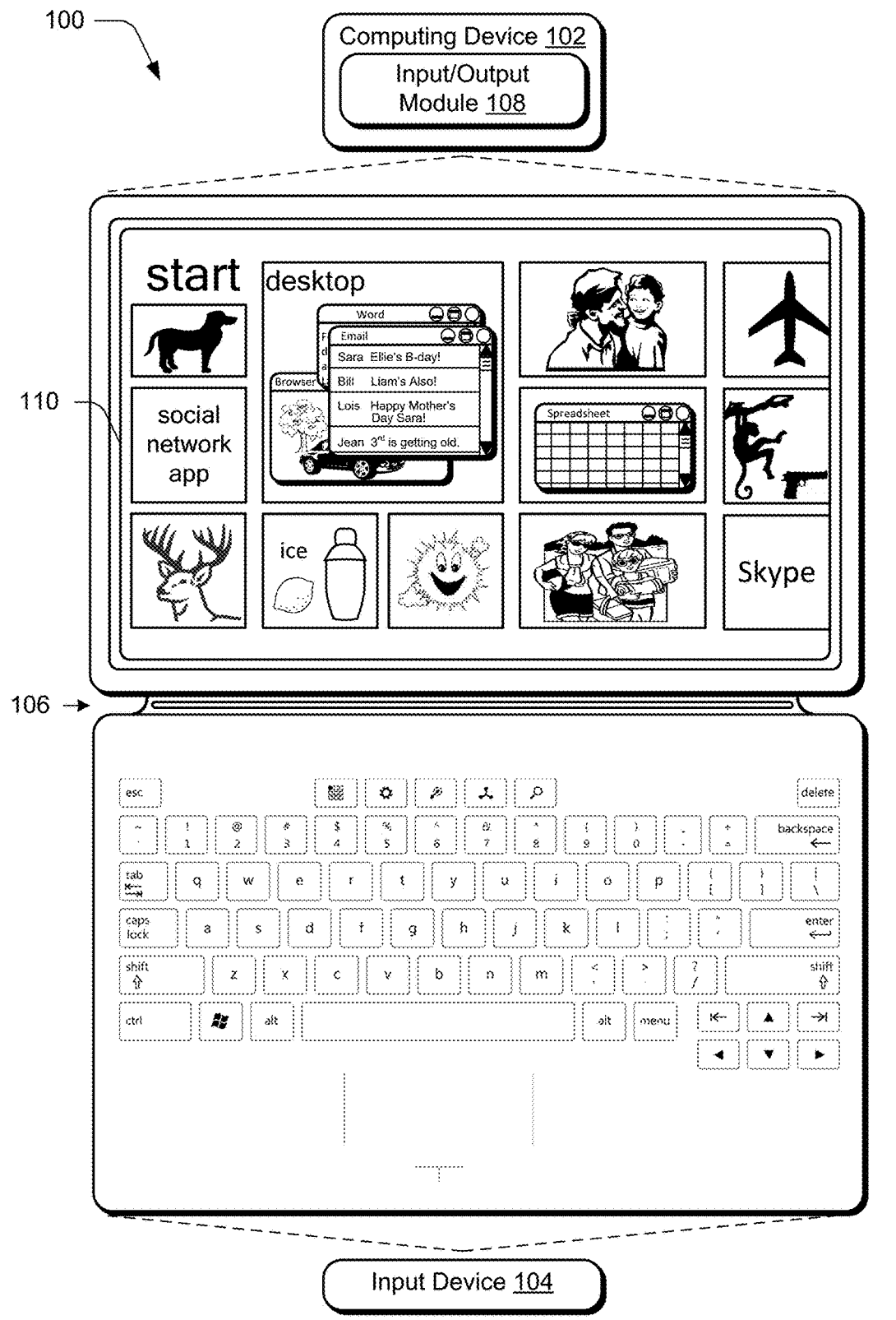
FIG. 1 depicts an exemplary computing device coupled with an input device (e.g., keyboard).

While the disclosed devices and systems are representative of embodiments in various forms, specific embodiments are illustrated in the drawings (and are hereafter described), with the understanding that the disclosure is intended to be illustrative and is not intended to limit the claim scope to the specific embodiments described and illustrated herein.

DETAILED DESCRIPTION

As used herein, the term "low-profile" may refer to the stack height, z-height (e.g., as measured along the z-axis), or thinness of an input device or a component thereof. In certain examples, a low-profile input device may refer to an input device having a stack height or z-height of less than 2.5 mm, less than 2 mm, less than 1.8 mm, less than 1.5 mm, in a range of 1-2.5 mm, in a range of 1-2 mm, in a range of 1-1.8 mm, in a range of 1-1.5 mm, in a range of 1.5-2.5 mm, in a range of 1.8-2.5 mm, in a range of 1.5-2 mm, in a range of 1.5-1.8 mm, or in a range of 2-2.5 mm.

As used herein, the term "first position" may refer to a resting, default, or inactive state of an input key within an input device where no input force is being applied to the input key by a user. In such a first position, the input key may be positioned adjacent to or abutting a surface of a bezel of the input device. Alternatively, in a hinged key input device, the input key is positioned parallel with the support structure in the first position.

As used herein, the term "second position" may refer to the position of the input key when an input force has been applied by a user and the input key has traveled a maximum possible distance within the input device. For example, the maximum possible distance may refer to the distance at which a portion of the input key abuts a surface of the support structure and is prevented from traveling any farther by the surface of the support structure. Upon removal of the input force by the user, the input key is configured to move from the second position back to the first position.

Low-profile keysets and input devices having low-profile keysets are described herein. Such low-profile devices have several potential end-uses or applications, including mobile electronic devices (i.e., devices capable of being transported from one place to another). Specifically, low-profile keysets may be advantageous in being able to construct an input device with minimal stack height. That is, the low-profile keyset within an input device may provide a reduced or thinner stack height for the input device in comparison to with current, commercial input devices.

Additionally, or alternatively, the low-profile keyset of the input device may provide an acceptable tactile response or input key travel distance despite the reduction in stack height. For example, the input key travel distance, as measured between the first and second positions of the input key along the z-axis, may be at least 0.5 mm, at least 1 mm, at least 1.5 mm, in a range of 0.5-1.5 mm, or in a range of 0.5-1 mm.

The input device having such a low-profile keyset may be incorporated into any computing device. For example, the input device may be a keyboard that is part of, connected to, or in communication with a computing device. Non-limiting examples of computing devices include personal computers (PCs), server computers, tablet and other handheld computing devices, laptop or mobile computers, communication devices such as mobile phones, multiprocessor systems, microprocessor-based systems, set top boxes, programmable consumer electronics, network PCs, minicomputers, mainframe computers, or audio or video media players. In certain examples, the computing device may be a wearable electronic device, wherein the device may be worn on or attached to a person's body or clothing. The wearable electronic device may be attached to a person's shirt or jacket; worn on a person's wrist, ankle, waist, or head; or worn over their eyes or ears. Such wearable devices may include a watch, heart-rate monitor, activity tracker, or head-mounted display.

Various non-limiting examples of low-profile keysets and input devices having such input keys or keysets are described in greater detail below.

Computing Device Overview

FIG. 1 depicts an environment 100 in an example implementation that is operable to employ the techniques described herein. The illustrated environment 100 includes an example of a computing device 102 that is communicatively coupled to an input device 104 via a hinge 106. The computing device 102 may be configured to have a range of processing powers and memory capacities. The computing device 102 may also include software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110, and so forth. Thus, the input/output module 108 may support a variety of different input techniques.

In the illustrated example, the input device 104 is configured as having an input portion that includes a low-profile keyset having a QWERTY arrangement of keys, in addition to number keys, a space bar, function keys (e.g., an 'enter' key), cursor keys, and track pad although other arrangements of keys are also contemplated. Further, other non-conventional configurations are also contemplated, such as a game controller, configuration to mimic a musical instrument, and so forth. Thus, the input device 104 and low-profile keys incorporated by the input device 104 may assume a variety of different configurations to support a variety of different functionalities.

As previously described, the input device 104 may be physically and communicatively coupled to the computing device 102, e.g., through use of a hinge 106. The hinge 106 may be flexible in that rotational movement supported by the hinge is achieved through flexing (e.g., bending) of the material forming the hinge. Alternatively, mechanical rotation may be supported by a pin, for example, by using a barrel hinge. Further, the flexible rotation may be configured to support movement in one or more directions (e.g., vertically in the figure) yet restrict movement in other directions, such as lateral movement of the input device 104 in relation to the computing device 102. This may be used to support consistent alignment of the backlit device 104 in relation to the computing device 102, such as to align sensors used to change power states, application states, and so on.

Alternatively, the input device 104 may be wirelessly connected to the computing device 102 over a communication network. The communication network may be a personal area network (PAN), a near-me area network (NAN), or a local area network (LAN). In some examples, the communication network includes communication via radio wave frequencies. In one particular example, the communication network includes Bluetooth technology, Bluetooth low energy (BLE) technology, or a comparable technology configured to transmit small packets of information.

Various non-limiting examples of low-profile input devices are described in greater detail below.

Input Devices with Flange Relief

Figure 2:
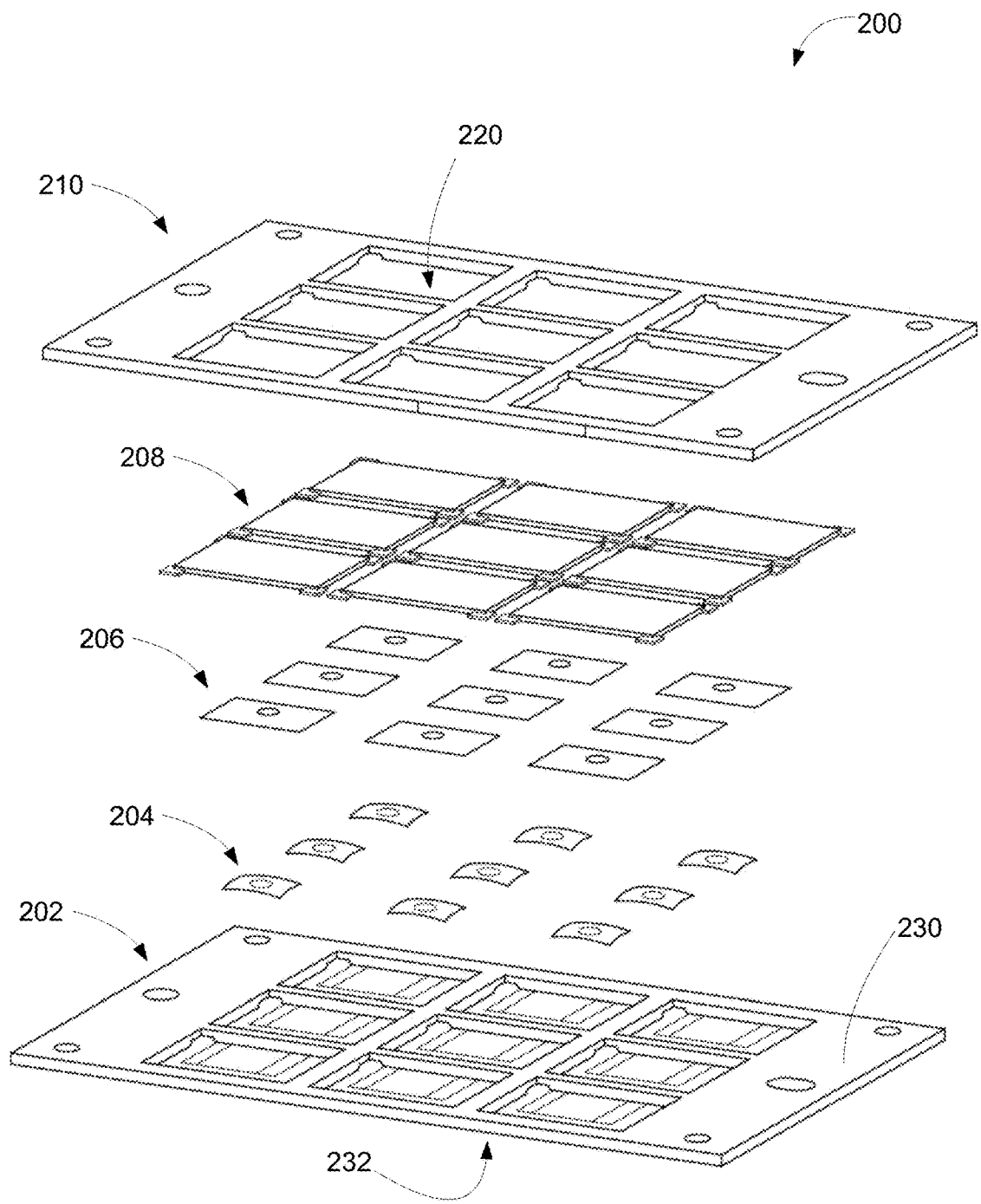
FIG. 2 depicts an exploded view of an exemplary input device having a bezel and a plurality of key caps.

FIG. 2 depicts an exploded view of an example of a low-profile input device 200. The low-profile input device 200 may include a support structure 202, at least one switch 204 (e.g., dome switch), at least one switch cover 206 (e.g., dome cover), at least one input key or key cap 208, and a bezel 210.

The low-profile input device 200 may have an overall stack height or z-height (e.g., as measured along the z-axis) for the combined layers of the input device 200 of less than 2.5 mm, less than 2 mm, less than 1.8 mm, less than 1.5 mm, in a range of 1-2.5 mm, in a range of 1-2 mm, in a range of 1-1.8 mm, in a range of 1-1.5 mm, in a range of 1.5-2.5 mm, in a range of 1.8-2.5 mm, in a range of 1.5-2 mm, in a range of 1.5-1.8 mm, or in a range of 2-2.5 mm.

Additionally, the low-profile input device 200 may be configured to provide an input key travel distance, (as measured along the z-axis between the first and second positions of the input key), of at least 0.5 mm, at least 1 mm, at least 1.5 mm, in a range of 0.5-1.5 mm, or in a range of 0.5-1 mm.

The input device 200 has a support structure 202 with a first, inner surface 230 and a second, external surface 232. The support structure 202 is configured to function as a base support and backing of the input device. The support structure 202 is configured to receive and process input (e.g., a key stroke) when an input key is pressed by a user. Further, as discussed in greater detail below, the support structure 202 is configured to have one or more cavities or relief areas to receive a portion of the input key as it is pressed by the user.

In certain examples, the thinness or height of the overall support structure 202 (as measured along the z-axis) is less than 1 mm, less than 0.8 mm, less than 0.6 mm, less than 0.5 mm, in a range of 0.1-1 mm, in a range of 0.1-0.8 mm, in a range of 0.1-0.6 mm, in a range of 0.1-0.5 mm, in a range of 0.5-1 mm, in a range of 0.5-0.8 mm, in a range of 0.5-0.6 mm, in a range of 0.6-1 mm, or in a range of 0.6-0.8 mm.

The support structure 202 may include one or more layers. In certain examples, the support structure 202 includes a circuit board (e.g., a printed circuit board assembly or "PCBA") positioned adjacent to the plurality of switches and configured to interact with and process the input received from the plurality of switches.

In certain examples, the thinness or height of the circuit board (as measured along the z-axis) is less than 0.5 mm, less than 0.4 mm, less than 0.3 mm, in a range of 0.1-0.5 mm, in a range of 0.1-0.4 mm, in a range of 0.1-0.3 mm, in a range of 0.2-0.5 mm, or in a range of 0.3-0.5 mm.

The support structure 202 may also include additional layers such as a smoothing layer and a backing layer. The smoothing layer of the support structure 202 may be positioned between the circuit board and the backing layer. The smoothing layer may be formed of any material (e.g., a polymer material) configured to cover up or reduce imperfections in an adjacent layer, such as the circuit board layer positioned between the plurality of switches and the smoothing layer. In other words, the continuous surface of the smoothing layer may conceal discontinuities or lateral gaps in circuit board layer. In other examples, the smoothing layer may be configured to reduce wrinkling or deformations of the outer layer. This may be accomplished based upon adhering the outer layer to the intermediate smoothing layer, as opposed to adhering the outer layer to the circuit board layer.

In certain examples, the thinness or height of the smoothing layer (as measured along the z-axis) is less than 0.3 mm, less than 0.2 mm, less than 0.1 mm, in a range of 0.01-0.3 mm, in a range of 0.01-0.2 mm, in a range of 0.01-0.1 mm, or in a range of 0.05-0.1 mm.

The backing layer of the support structure 202 may be configured to provide an outer backing surface to the input device 200. The backing layer, for instance, may be formed from one or more sub-layers of polymer material such as a thermoplastic polymer, a silicone, or a polyurethane. In some examples, the backing layer is formed from a polyurethane laminate, where a cloth fabric is laminated onto a thin film of polyurethane.

In certain examples, the thinness or height of the backing layer (as measured along the z-axis) is less than 0.5 mm, less than 0.3 mm, less than 0.2 mm, in a range of 0.01-0.5 mm, in a range of 0.1-0.3 mm, in a range of 0.1-0.2 mm, or in a range of 0.05-0.2 mm.

As noted above, the input device 200 may also include at least one switch 204. The switch is configured to be compressed when an input key is pressed toward the support structure, to generate a signal based on the key being pressed. The switch 204 may be in the shape of a dome (i.e., a dome switch).

The switch 204 may be made of any compressible material, such as a polymer material. The polymer material may be made of a thermoplastic polymer, a silicone, or a polyurethane. In other examples, the switch or dome 204 is formed from a metallic composition. The metallic composition may include one or more metals or metal alloys such as aluminum, copper, iron, lead, magnesium, molybdenum, nickel, osmium, palladium, platinum, rhenium, rhodium, ruthenium, sliver, steel, tantalum, thorium, titanium, vanadium, or alloys thereof. In one example, the metallic composition is stainless steel (such as work hardened 300 series stainless steel or 304 half-hard stainless steel). A metallic switch or dome 204 may be advantageous in providing the appropriate tactile feedback to a user for a low-profile input device. Additionally, stainless steel switches or domes may be advantageous for having good elastic and fatigue properties, e.g., capable of being activated up to 10 million cycles without any significant degradation in force displacement performance.

In certain examples, a switch 204 may be covered by a switch cover 206. The switch cover 206 (e.g., dome cover) may be configured to retain the switch (e.g., dome) in place and protect the switch from contamination or spills. In certain examples, the switch cover 206 may be a polymer material such as a thermoplastic polymer, a silicone, or a polyurethane. In some examples, the switch cover includes a plunger (discussed in greater detail below).

In certain examples, the combined thinness or height of the switch and switch cover (with a plunger included) (as measured along the z-axis) is less than 1.5 mm, less than 1.2 mm, less than 1.1 mm, less than 1 mm, in a range of 0.1-1.5 mm, in a range of 0.5-1.2 mm, in a range of 0.5-1.1 mm, or in a range of 1-1.2 mm.

As noted above, the input device 200 may include one or more input keys or key caps 208. The input key 208 is configured to be pressed by a user and moved between a "first position" and a "second position" to activate a function of the input device. As noted above, the first position of the input key 208 may refer to the resting or inactive state of the input key 208 where no input force is being applied by a user. In such a first position, the input key 208 is positioned adjacent to or abutting a surface of the bezel 210. The second position of the input key 208 may refer to the position of the input key 208 when an input force has been applied by a user and the input key has traveled a maximum possible distance to abut a surface of the support structure 202 and is prevented from traveling any farther by the surface of the support structure 202.

In certain examples, the input key 208 is made of a thermoplastic polymer, a silicone, or a polyurethane. In other examples, the input key 208 is formed from a metallic composition. The metallic composition may include one or more metals or metal alloys such as aluminum, copper, iron, lead, magnesium, molybdenum, nickel, osmium, palladium, platinum, rhenium, rhodium, ruthenium, sliver, steel, tantalum, thorium, titanium, vanadium, or alloys thereof. In one example, the metallic composition is stainless steel. A metallic input key 208 may be advantageous in providing a thinner input device profile (e.g., as measured in along the z-axis).

In certain examples, the thinness or height of a thermoplastic input key (as measured along the z-axis, and excluding the height added by a flange, which is discussed in greater detail below) is less than 0.6 mm, less than 0.5 mm, less than 0.4 mm, in a range of 0.2-0.6 mm, in a range of 0.3-0.5 mm, or in a range of 0.4-0.5 mm.

In certain examples, the thinness or height of a metallic input key (as measured along the z-axis, and excluding the height added by a flange, which is discussed in greater detail below) is less than 0.2 mm, less than 0.15 mm, less than 0.1 mm, in a range of 0.01-0.2 mm, in a range of 0.05-0.15 mm, or in a range of 0.05-0.1 mm.

In certain examples, the key cap 208 may be coated or covered with a noise softening layer. The noise softening layer is advantageous in reducing the sound associated with the striking of the input key. This is particularly advantageous when the key cap is made of a metallic composition. In some examples, the noise softening layer may be a paint layer. The thinness or height of the noise softening layer (e.g., paint layer), as measured in the z-direction, may be in a range of 0.01-0.2 mm, 0.05-0.15 mm, or 0.1 mm.

Additionally, the input device 200 may include a bezel 210 having a first, interior surface and a second, outer surface. The first surface of the bezel is configured to be positioned adjacent to the internal surface of the support structure 202. The bezel 210 includes an opening 220 for each input key 208, wherein the bezel 210 is configured to surround and retain the one or more input keys or key caps 208 in place. In certain examples, the bezel 210 is made of a thermoplastic polymer, a silicone, or a polyurethane. In certain examples, the bezel 210 includes an injected molded glass filled polymer. In such an example, the bezel may include 10-50 percent by weight glass filled polycarbonate or 10-50 percent by weight glass filled nylon.

In other examples, the bezel 210 is formed from a metallic composition. The metallic composition may include one or more metals or metal alloys such as aluminum, copper, iron, lead, magnesium, molybdenum, nickel, osmium, palladium, platinum, rhenium, rhodium, ruthenium, sliver, steel, tantalum, thorium, titanium, vanadium, or alloys thereof. In one example, the metallic composition is stainless steel. The input device 200 may include additional layers or features, such as those discussed below with reference to FIGS. 9 and 10.

In certain examples, the thinness or height of the bezel (as measured along the z-axis) is less than 0.2 mm, less than 0.15 mm, less than 0.1 mm, in a range of 0.01-0.2 mm, in a range of 0.05-0.15 mm, or in a range of 0.05-0.1 mm.

Figure 3A:
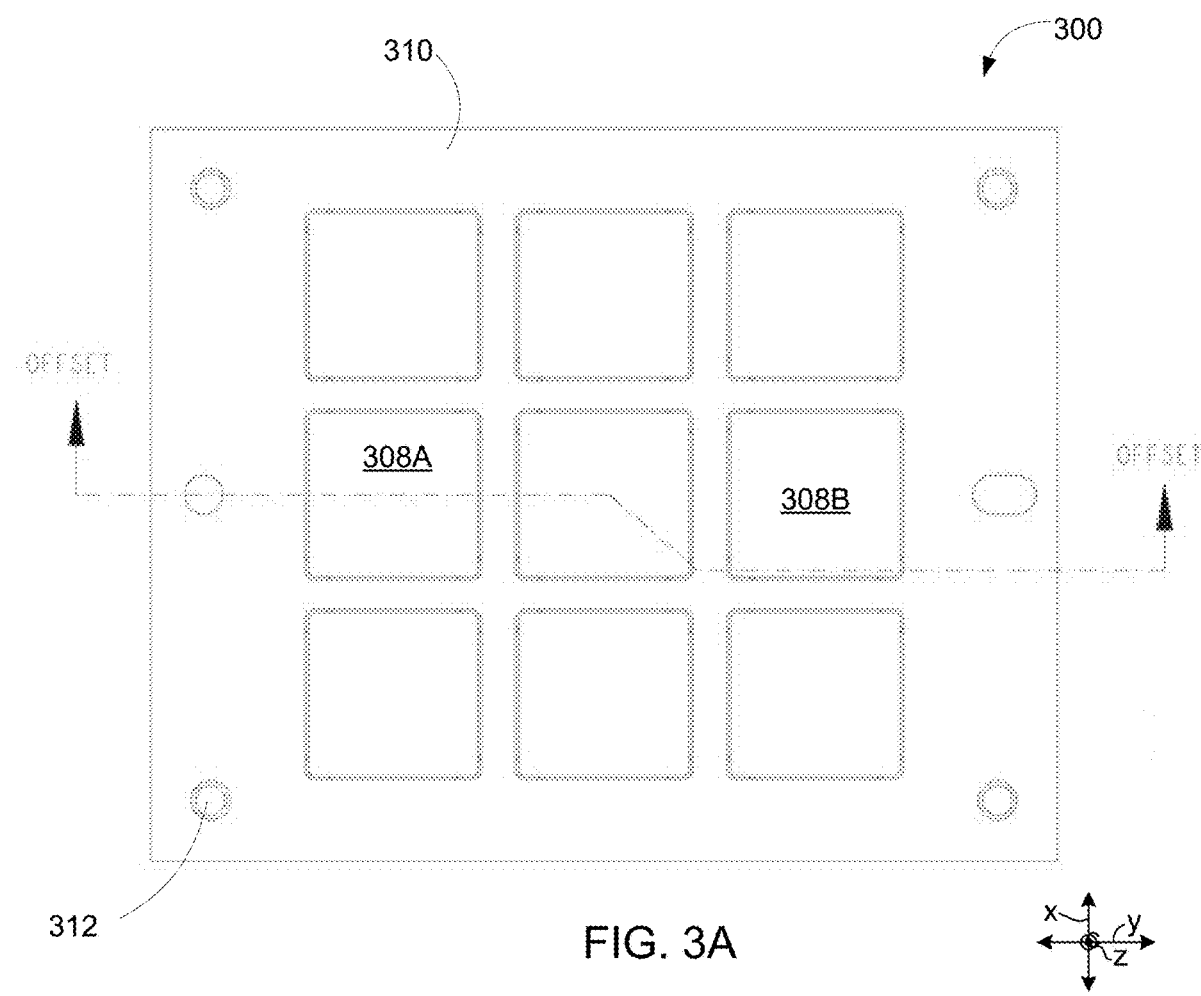
FIG. 3A depicts an example of a top view of an input device having a bezel and a plurality of key caps.

FIGS. 3A-4B depict various views of an example of an input device 300. Specifically, FIG. 3A depicts a top view of an input device 300. In this top view, the input device 300 includes a bezel 310 that houses a plurality of input keys or key caps 308A, 308B. The bezel is attached to an underlying support structure 302 via a plurality of screw or bolt attachments 312.

Figure 3B:
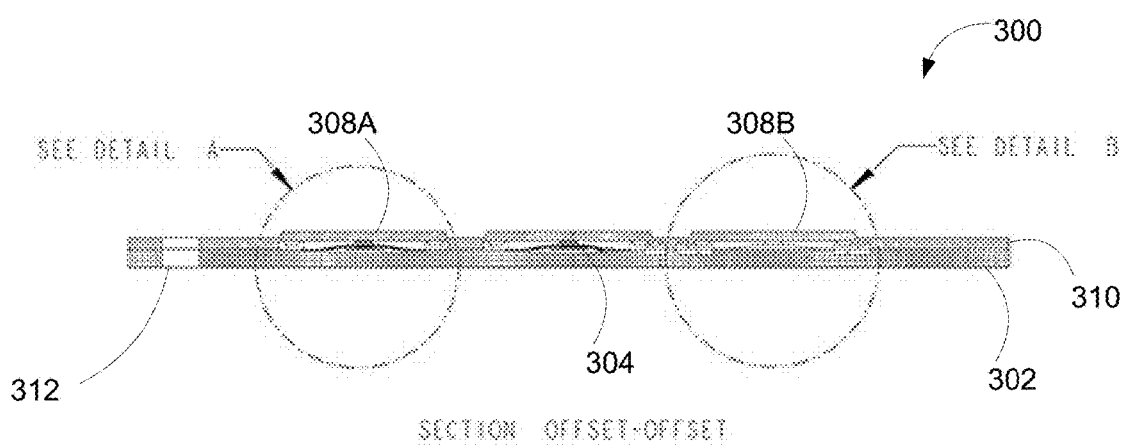
FIG. 3B depicts a cross-sectional side view of the input device of FIG. 3A along the dashed line.

FIG. 3B depicts a cross-sectional side view of the input device of FIG. 3A along the dashed line ('offset') to provide a view of a center cross-section of a key cap 308A as well as a cross-section at an edge of a key cap 308B. As shown in this cross-sectional view, the input device 300 further includes a plurality of switches 304 (e.g., domes) and switch covers 306 (e.g., dome covers) positioned between the key caps 308A, 308B and a support structure 302.

Figure 4A:
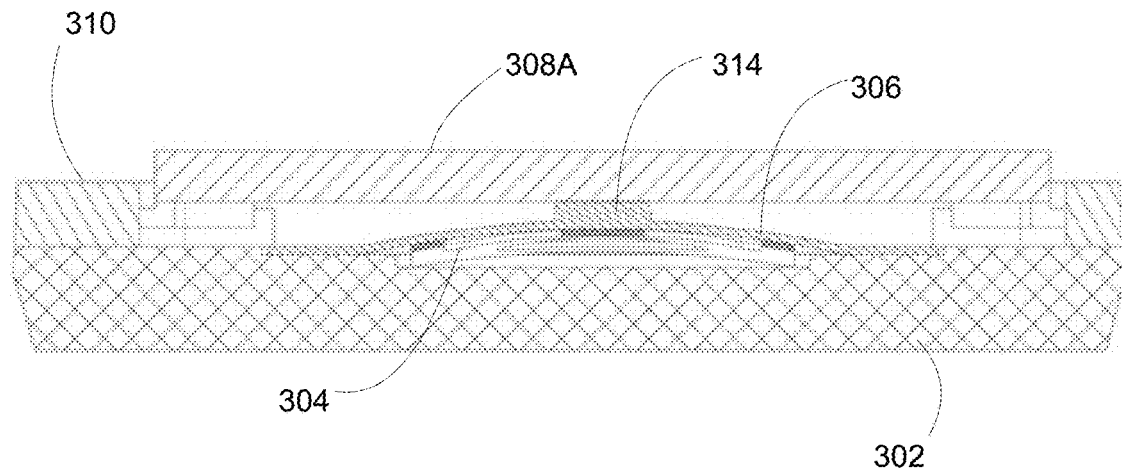
FIG. 4A depicts a detailed cross-sectional side view of 'Detail A' in FIG. 3B.

FIG. 4A depicts a detailed cross-sectional side view of 'Detail A' in FIG. 3B depicting the center cross-section of key cap 308A. The dome 304 and dome cover 306 are positioned in a center area of the key cap 308 as measured along the x and y axes.

As depicted in FIG. 4A, the input device 300 includes a plunger 314 positioned between an inner, first surface of the key cap 308A and a surface of the dome cover 306. The plunger 314 may be part of the key cap 308A, part of the dome cover 306, or a separate component positioned between and adhered to either the key cap 308A or dome cover 306.

In certain examples, the thinness or height of the plunger (as measured along the z-axis) is less than 0.5 mm, less than 0.4 mm, less than 0.3 mm, in a range of 0.1-0.5 mm, in a range of 0.1-0.4 mm, or in a range of 0.1-0.3 mm.

The plunger 314 is configured to direct an input force applied by a user over the center of the switch or dome 306. Additionally, the plunger 314 may provide resistance against movement of the key cap 308A along the z-axis direction. The plunger 314 may be configured to compress when the input key or key cap 308A is moved between the first position and second position. In some examples, the plunger 314 may compress at least 0.05 mm, at least 0.1 mm, or at least 0.2 mm when the input key or key cap 308A moves between the first and second position.

Additionally, the input device 300 may be configured to have nominal interference between the key cap 308A and plunger 314 such that the plunger presses upward in the z-axis direction and provides a tight fit between the key cap 308A and an inner, first surface of the bezel 310 retaining the key cap 308A. This is advantageous in reducing or eliminating undesired movement of the key cap 308A within the housing of the input device 300 (e.g., the plunger 314 arrangement may reduce rattling of the key cap when a user rests their fingers lightly on the key caps).

The plunger 314 may be made of a rigid or elastomeric material. In certain examples, the plunger 314 is made of a compressible, elastomeric material. The elastomeric material may be a polymer material such as a thermoplastic polymer, a silicone, or a polyurethane. In certain particular examples, the elastomeric material is a silicone rubber having a hardness in a range of 40 Shore A to 70 Shore A.

Figure 5:
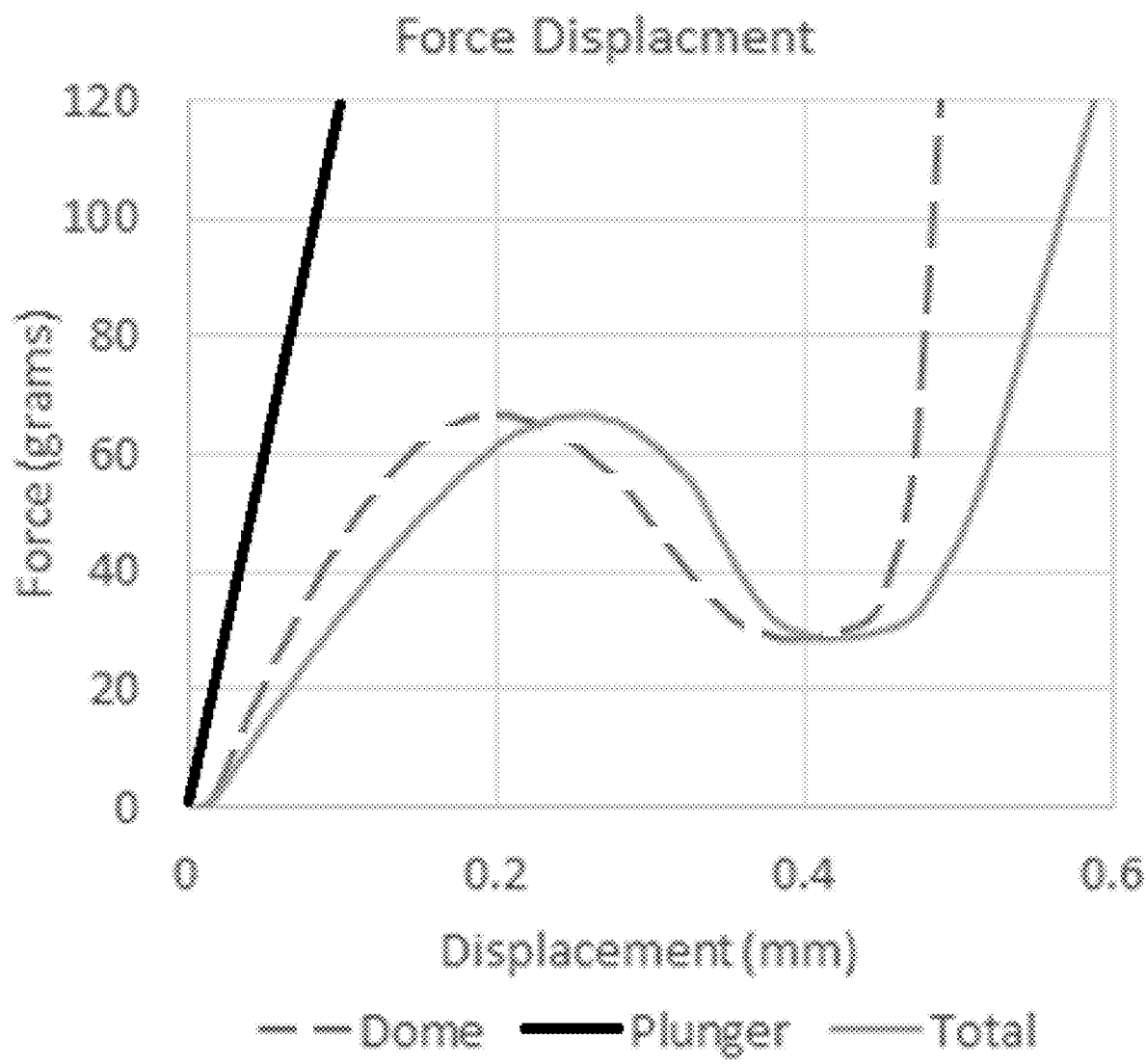
FIG. 5 depicts an example of a force displacement curve for various elements of an input device.

In certain examples, an elastomeric or compressible plunger composition may be advantageous in providing an appropriate tactile feedback to a user for a low-profile input device. Specifically, the elastomeric plunger may alter (e.g., soften) the force displacement of the input key as it is pressed inward toward the support structure. In other words, the elastomeric plunger may soften or reduce the force over displacement distance slope as the input key moves between the first and second position. Such a phenomenon is depicted in FIG. 5, discussed in greater detail below.

Figure 4B:
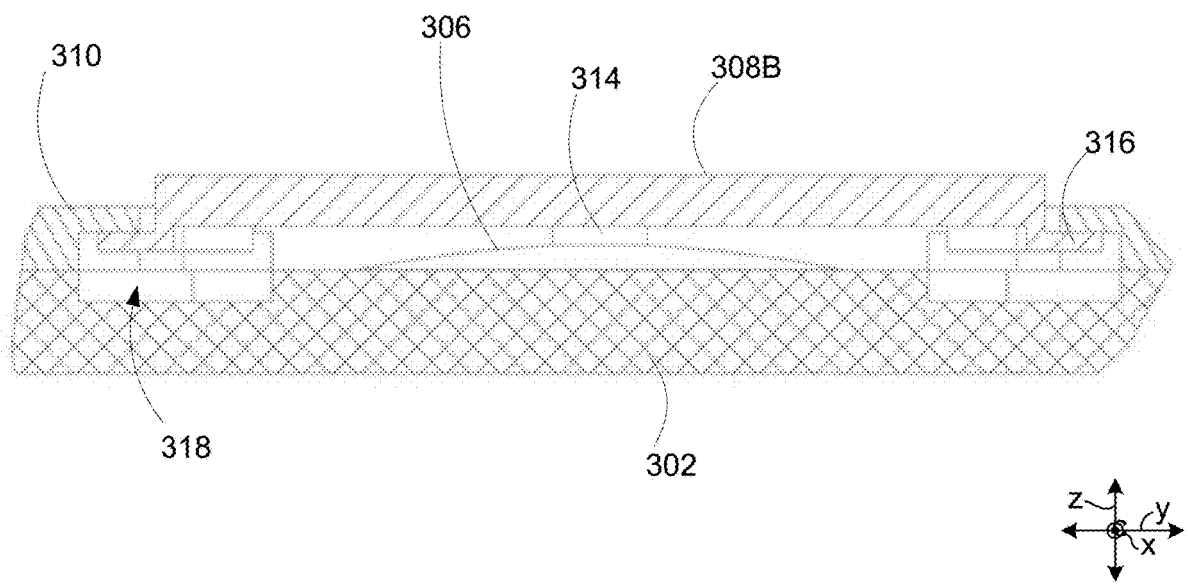
FIG. 4B depicts a detailed cross-sectional side view of 'Detail B' in FIG. 3B.

FIG. 4B depicts a detailed cross-sectional side view of 'Detail B' in FIG. 3B depicting the cross-section at the edge of key cap 308B. As depicted, the input key or key cap includes a flange 316 positioned at each corner of the key cap. Each flange 316 is positioned between the first surface of the bezel and the first surface of the support structure. This is advantageous in allowing the bezel 310 to retain or secure the key cap 308B between the bezel 310 and support structure 302. Additionally, the flanges 316 are advantageous in restricting movement of the key cap 308B in an undesired direction. Specifically, the flanges 316 are advantageous in preventing a tilting motion of the key cap 308B if the key cap is pressed downward toward the support structure 302 at an off-center location. In other words, the flanges 316 limit the rotation angle of the key cap 308B and allow an off-center activation or force to still compress the dome with limited or no tilting motion.

In certain examples, the thinness or height of the flange 316 of the keycap 308B (as measured along the z-axis) may be similar to the height of the input key discussed above. For example, for a thermoplastic flange, the height of the flange 316 may be less than 0.6 mm, less than 0.5 mm, less than 0.4 mm, in a range of 0.2-0.6 mm, in a range of 0.3-0.5 mm, or in a range of 0.4-0.5 mm. Alternatively, the thinness or height of a metallic flange may be less than 0.2 mm, less than 0.15 mm, less than 0.1 mm, in a range of 0.01-0.2 mm, in a range of 0.05-0.15 mm, or in a range of 0.05-0.1 mm.

As noted above, the input device 300 includes a plunger 314 positioned between an inner, first surface of the key cap 308A and a surface of the dome cover 306. The plunger 314 is configured to press upward in the z-axis direction to provide an interference fit between the key cap 308B and an inner, first surface of the bezel 310 retaining the key cap 308B. Specifically, the plunger 314 is configured to provide an interference fit where the flanges 316 of the key cap 308B abut the inner, first surface of the bezel 310. As noted above, this may refer to the first position of the input key 300.

As depicted in FIG. 4B, the flanges 316 add z-height to the key cap. Therefore, to reduce the overall stack height of the input device 300, clearance pockets, flange reliefs, or cavities 318 are provided in the support structure 302. These cavities 318 or pockets are provided within or carved out of the inner layer or surface of the support structure 302. The cavities 318 are configured to receive the flanges 316 as the input key 308B is pressed by a user and moved downward toward the support structure between the first and second position to activate a function of the input device 300. In other words, the flanges 316 of the key cap are configured to move into respective cavities 318 in the first surface of the support structure 302 when the key cap 308B is moved from the first position to the second position.

In certain examples, the depth of the cavity (as measured along the z-axis) may be equal to or greater than the height of the respective flange that is configured to move into the cavity. For example, for a thermoplastic flange, the depth of the cavity may be may be at least 0.6 mm, at least 0.5 mm, at least 0.4 mm, in a range of 0.2-0.6 mm, in a range of 0.3-0.5 mm, or in a range of 0.4-0.5 mm. Alternatively, for a metallic flange, the depth of a cavity may be at least 0.2 mm, at least 0.15 mm, at least 0.1 mm, in a range of 0.01-0.2 mm, in a range of 0.05-0.15 mm, or in a range of 0.05-0.1 mm.

As such, the flange reliefs or cavities 318 are advantageous in reducing the overall stack height of the input device 300 while still allowing the key cap to actuate the dome switch 304. Additionally, the flange reliefs or cavities 318 are advantageous in providing an acceptable user experience (e.g., an acceptable tactile feedback based on a key stroke travel distance of at least 0.5 mm of the input key between the first position and the second position is at least 0.5 mm, as measured along the z-axis).

FIG. 5 depicts an example of a force displacement curve for various elements of an input device. As discussed above, the presence of an elastomeric or compressible plunger composition may be advantageous in altering (e.g., softening) the force displacement of the input key as it is pressed inward toward the support structure. As depicted in FIG. 5, the elastomeric plunger linearly compresses as the input force is increased from 0 to 120 grams. At 120 grams of force, a 0.3 mm thick plunger made of 70 Shore A elastomeric material may compress 0.1 mm. It is noted that, in other examples, the elastomeric plunger composition may be configured to compress in a non-linear fashion. In other words, the plunger compression force versus displacement for the plunger material may be linear or non-linear.

Additionally, FIG. 5 depicts that a dome cover made of a similar elastomeric material undergoes a different displacement curve when coupled with a dome. As the force increases, the dome cover and dome require an initial maximum force (F1) of approximately 65 grams to displace the dome cover and dome approximately 0.2 mm before the force displacement becomes easier. The minimum force (F2) required as the displacement continues to approximately 0.4 mm is approximately 30 grams. This, incidentally, represents the snap ratio for an input key, i.e., Snap Ratio=(F1−F2)/F1. A snap ratio of at least 50% may be advantageous for providing good tactile feedback and a desirable user experience.

Returning to FIG. 5, after the dome and dome cover have been displaced 0.4 mm, the force required to continue displacement of the dome and dome curve becomes much more difficult. The curve is very sharp between 0.4 mm and 0.5 mm of displacement.

By combining an elastomeric plunger with the dome and dome cover, the force displacement curve may be shifted to soften or reduce the slope of the force/displacement as the input key moves between the first and second positions. This is particularly advantageous near the end of the input key movement, as the input key approaches and abuts the second/end position. As depicted in FIG. 5, the slope of the displacement curve between 0.4 mm and 0.6 mm is reduced or softened when the elastomeric plunger is combined with the dome and dome cover.

Figure 6:
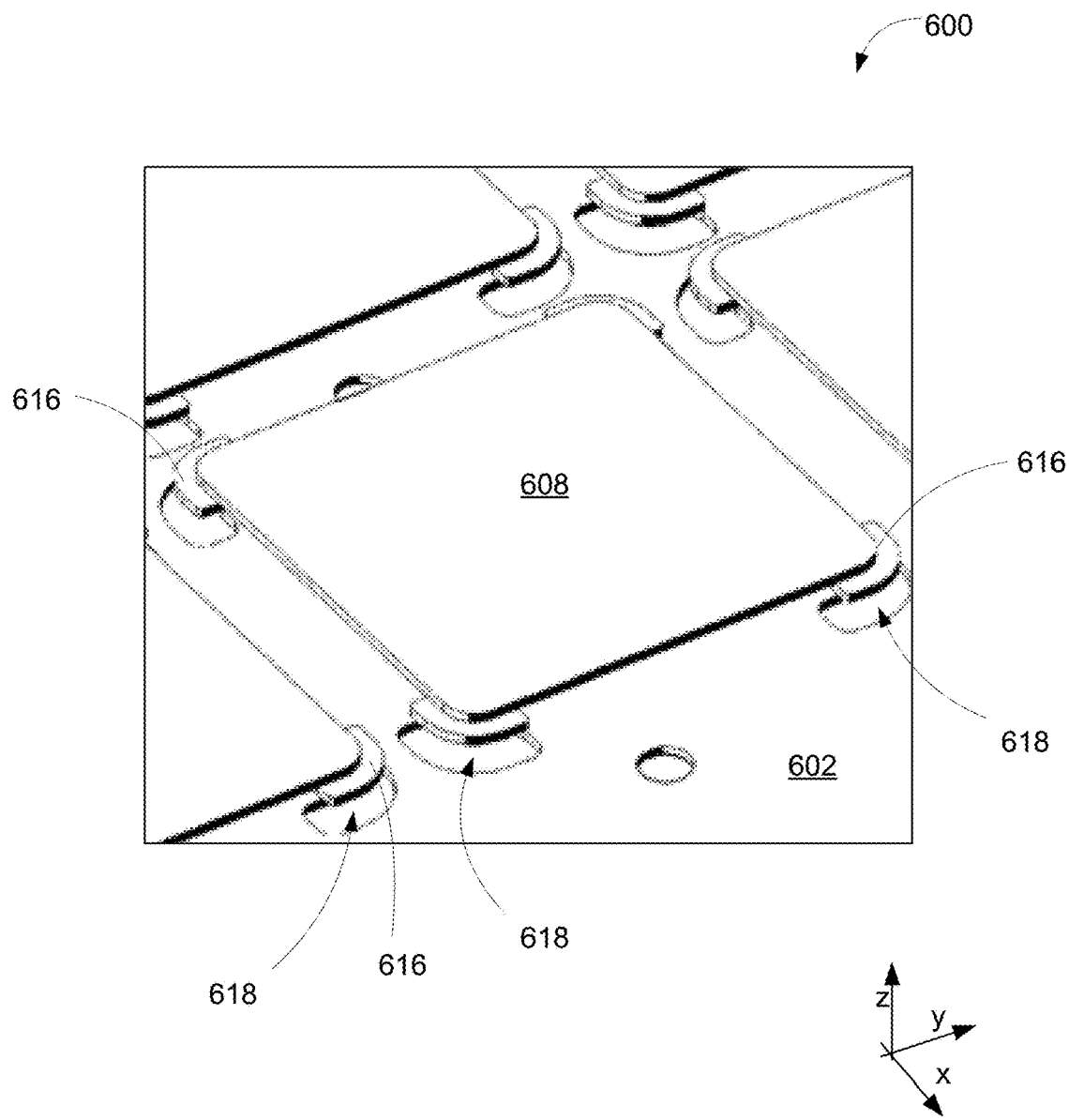
FIG. 6 depicts an isometric view of an example of an input device having a support structure with a plurality of cavities or flange reliefs.

FIG. 6 depicts an isometric view of an example of an input device 600 without a bezel in order to highlight the flange relief areas or cavities within a support structure 602. In this example, the input device 600 includes an input key or key cap 608 having a flange 616 positioned in each corner of the key cap 608. The input device 600 also includes an individual flange relief or cavity 618 in the support structure 602 for each individual flange 616. In an alternative example, a larger carve out or flange relief may be provided to accommodate multiple flanges, such as adjacent flanges of a same or separate input key.

Figure 7:
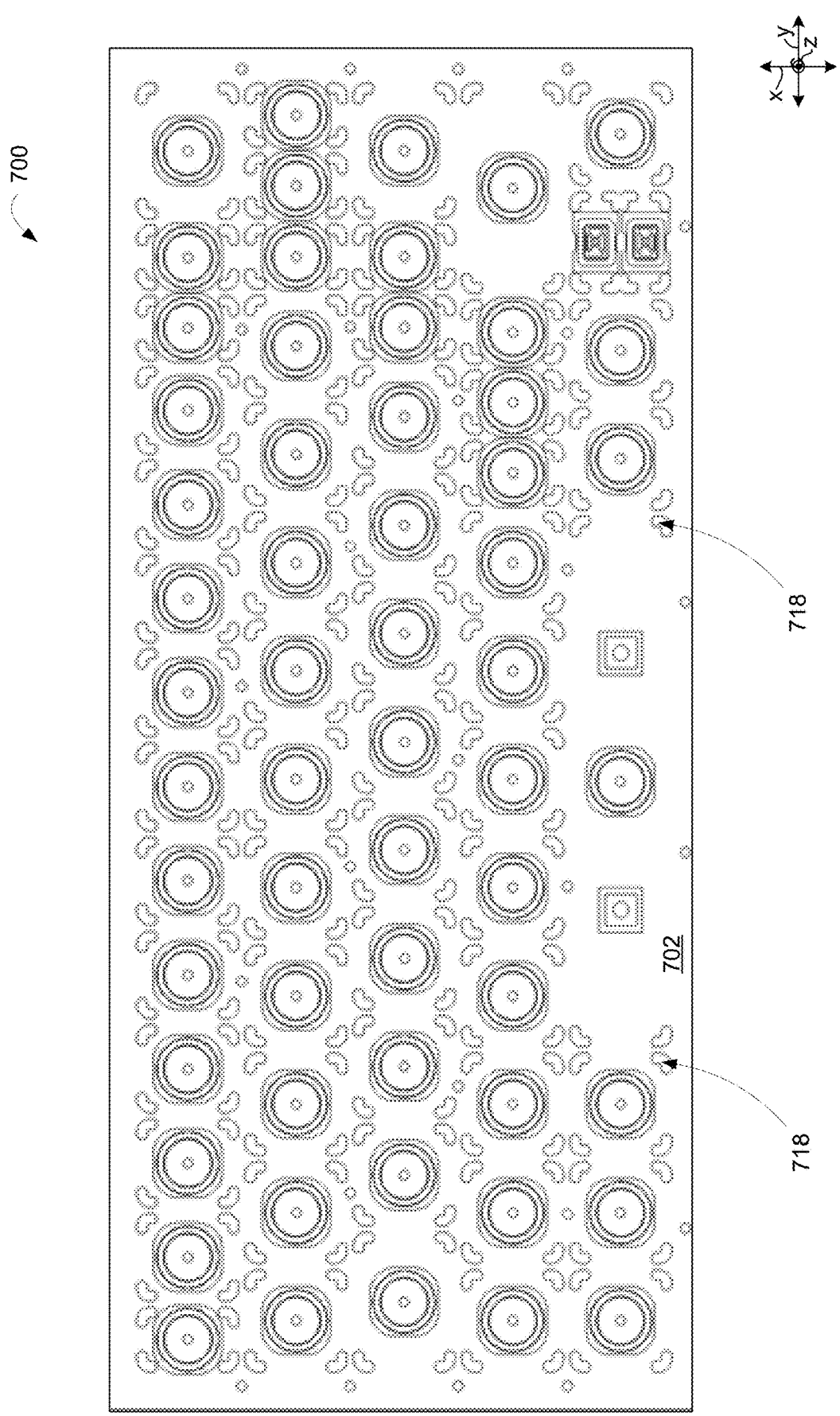
FIG. 7 depicts a top view of an example of a support structure of an input device having a plurality of cavities or flange reliefs.

FIG. 7 depicts a top view of an example of a support structure 702 of an input device 700 having a plurality of cavities or flange reliefs 718. As depicted, individual cavities are provided in each corner of a respective input key. Additionally, for a large input key such as a space bar, (which may be present with a QWERTY keyboard arrangement, in addition to number keys, function keys, and/or cursor keys), the arrangement of cavities or flange reliefs for the large input key may be altered to prevent unnecessary flexing of the large input key.

Figure 8:
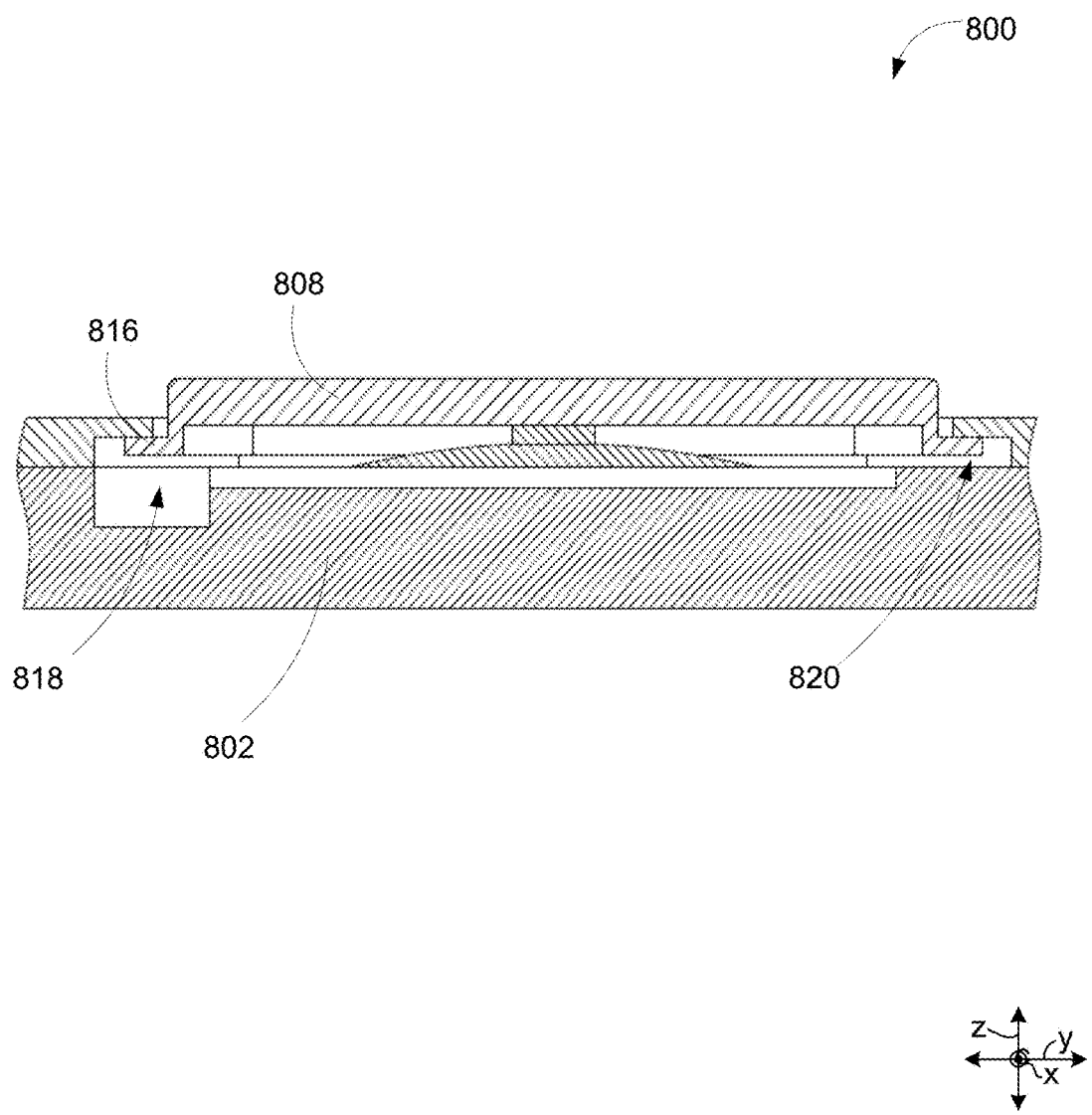
FIG. 8 depicts a cross-sectional view of an example arrangement for a large/long input key cap (e.g., a space bar).

FIG. 8 depicts a cross-sectional view of an example arrangement 800 for a large or elongated input key cap 808 such as a space bar. Such large input keys may problematically rotate from side to side or bend/flex when an input force is placed near an end of the input key (as compared to an input force placed near the center of the key). Such a problem may be addressed by designing the large input key 808 out of a sufficiently stiff material such as a metal (e.g., stainless steel). Additionally, or alternatively, a flange relief may be eliminated on one edge (e.g., the elongated edge) of the large input key 808. For example, as depicted in FIG. 8, a cavity 818 is positioned within the support structure 802 at one edge of the input key 808. The cavity 818 is configured to receive the flange 816 of the input key 808. The opposite edge of the input key 808 includes a flange 816 but does not include a respective cavity or flange relief in the support structure 802, therein defining a hinged long edge 820. This creates a hinged input key that minimizes movement near the edge having no flange relief, wherein the input key 808 pivots or hinges around the flange having no flange relief. This advantageously prevents certain bending or rotation of the input key 808.

Figure 9:
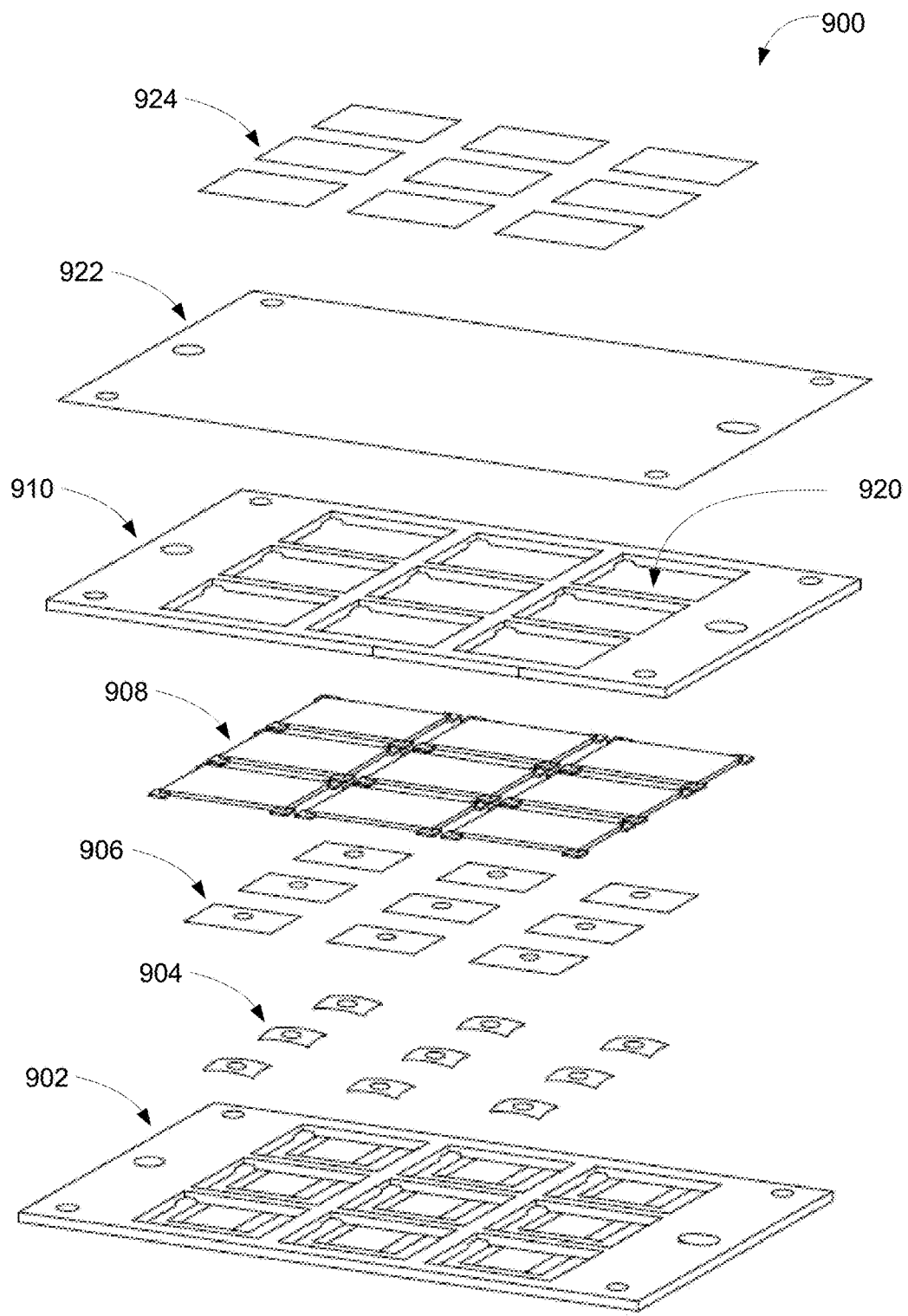
FIG. 9 depicts an exploded view of an exemplary input device having a fabric cover and overlays positioned above the bezel.

FIG. 9 depicts an exploded view of an exemplary input device 900 having a support structure 902, dome switches 904, dome covers 906, input keys 908, a bezel 910 having a plurality of openings 920 for the input keys 908, a fabric cover 922, and overlays 924 positioned above the bezel. As noted above, the input device described with reference to FIG. 2 may include additional layers or features. FIG. 9 provides a non-limiting example 900 of such additional features.

Specifically, the input device 900 includes a fabric cover 922 positioned over the bezel 910 and input keys 908. The fabric cover 922 may be advantageous in protecting the internal components such as the dome switches 904 or support structure from contamination or spills.

The fabric cover 922 may be a polyurethane or microfiber fabric. In certain examples, the elasticity of the fabric cover 922 does not affect the force required to move the input key 908 between the first and second position and displace the dome switch 904. In other examples, the elasticity of the fabric cover 922 may affect the force displacement curve and snap ratio of the input device 900. In such an example, it is advantageous to reduce or eliminate any negative user experience impact from the fabric cover 922 by only adhering the fabric cover 922 to the bezel and not to the input keys 908. In such an arrangement, the input key 908, unbonded to the fabric cover, may advantageously move between the first and second positions as if no fabric cover exists.

The overall thickness of the fabric cover 922 is configurable. In certain examples, the thinness or height of the fabric cover 922, as measured in the z-direction, may be in a range of 0.01-0.3 mm, 0.05-0.3 mm, 0.05-0.2 mm, 0.1-0.2 mm, 0.1-0.3 mm, or 0.2-0.3 mm.

In addition to the fabric cover 922, individual overlays 924 may be positioned on the outer surface of the fabric cover 922 to identify the underlying, covered input keys 908. The overlays 924 may be formed in the shape of the underlying input keys 908. The overlays 924 may be made of a fabric or polymer material such as a thermoplastic polymer, a silicone, or a polyurethane. The thinness or height of an overlay 924, as measured in the z-direction, may be in a range of 0.01-0.5 mm, 0.1-0.5 mm, 0.2-0.5 mm, 0.3-0.5 mm, 0.1-0.3 mm, or 0.1-0.2 mm.

Figure 10:
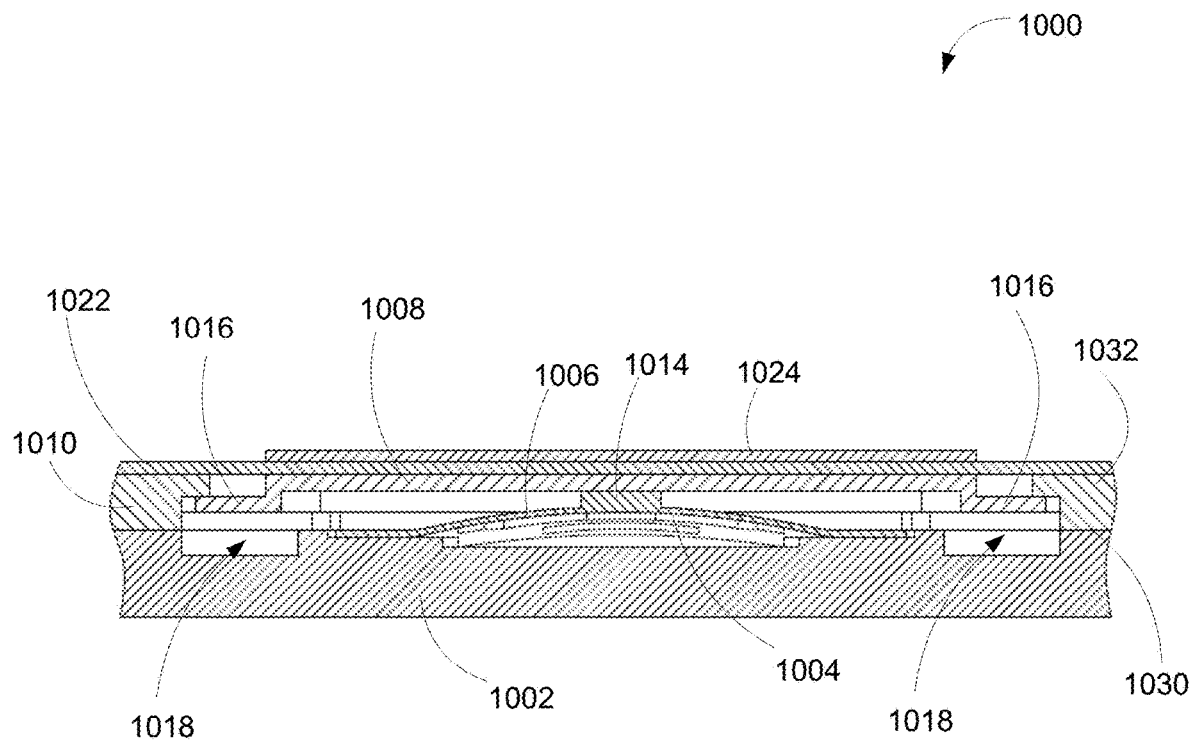
FIG. 10 depicts a cross-sectional side view of an exemplary input device having a fabric cover and overlay.

FIG. 10 depicts a cross-sectional side view of an exemplary input device 1000 having a fabric cover and overlay.

The input device 1000 includes a support structure 1002 having a plurality of cavities 1018, a switch (e.g., dome switch) 1004, a switch cover 1006, an input key or key cap 1008 having a plurality of flanges 1016, a bezel 1010, a plunger 1014, a fabric cover 1022, and an overlay 1024.

As noted above, the support structure 1002 may include one or more layers (e.g., a circuit board layer, smoothing layer, and/or backing layer, as discussed above. The support structure 1002 includes one or more cavities or relief areas 1018 to receive a portion of the input key (e.g., a flange 1016) as the input key 1008 moves toward the support structure 1002.

The switch 1004 is configured to be compressed when an input key 1008 is pressed toward the support structure 10002, to generate a signal based on the input key 1008 being pressed. The switch 1004 may be in the shape of a dome (i.e., a dome switch).

The switch 1004 is covered by a switch cover 1006. The switch cover 1006 (e.g., dome cover) may be configured to retain the switch (e.g., dome) in place and protect the switch from contamination or spills.

The bezel 1010 has a first, interior surface 1030 and a second, outer surface 1032. The first surface 1030 of the bezel is positioned adjacent to the internal surface of the support structure 1002. The bezel 1010 includes an opening for the input key 1008, wherein the bezel 1010 is configured to surround and retain the one or more input keys or key caps 208 in place. In certain examples, the bezel 1010 is made of a thermoplastic polymer, a silicone, or a polyurethane. In other examples, the bezel 1010 is formed from a metallic composition such as stainless steel.

The input key 1008 or key cap includes a flange 1016 positioned at each corner of the input key 1008. Each flange 1016 is positioned between the first, inner surface of the bezel and the first, inner surface of the support structure 1002.

The plunger 1014 of the input device 1000 is positioned between a surface of the input key 1008 and a surface of the dome cover 1006. In this example, the plunger 1014 is part of the dome cover 1006. Alternatively, the plunger 1014 may be part of the key cap 1008, or a separate component positioned between and adhered to either the key cap 1008 or dome cover 1006.

A fabric cover 1022 is positioned over the bezel 1010 and input key 1008. In this example, the fabric cover 1022 is adhere to the bezel 1010 and not to the input key 1008. In such an arrangement, the input key 1008, unbonded to the fabric cover, may advantageously move between the first and second positions as if no fabric cover exists.

The input device 1000 also includes an overlay 1024 positioned on the outer surface of the fabric cover 1022. The overlay 1024 is configured to provide a visual indication or identification of the underlying, covered input key 1008.

Input Devices Having a Key Plate with Hinged Keys

Figure 11:
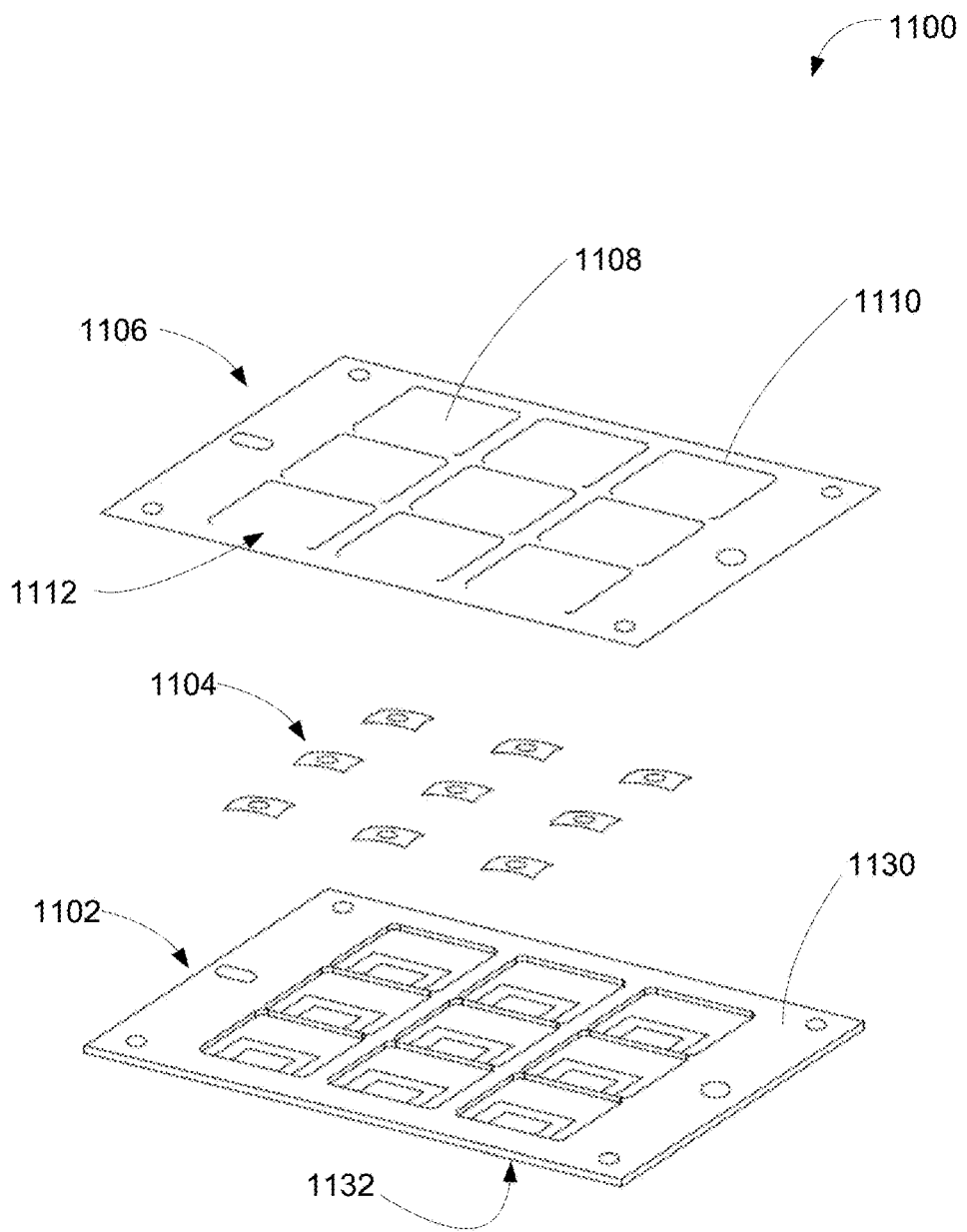
FIG. 11 depicts an exploded view of an exemplary input device having a key plate with a plurality of hinged keys.

FIG. 11 depicts an exploded view of an exemplary input device 1100 having a key plate with a plurality of hinged keys. The low-profile input device 1100 may include a support structure 1102, at least one switch (e.g., dome switch) 1104, and a key plate 1106 having at least one input key 1108.

The low-profile input device 1100 may have an overall stack height or z-height (e.g., as measured along the z-axis) for the combined layers of the input device 1100 of less than 2.5 mm, less than 2 mm, less than 1.8 mm, less than 1.5 mm, in a range of 1-2.5 mm, in a range of 1-2 mm, in a range of 1-1.8 mm, in a range of 1-1.5 mm, in a range of 1.5-2.5 mm, in a range of 1.8-2.5 mm, in a range of 1.5-2 mm, in a range of 1.5-1.8 mm, or in a range of 2-2.5 mm.

Additionally, the low-profile input device 1100 may have an input key travel distance, as measured between the first and second positions of the input key along the z-axis, of at least 0.5 mm, at least 1 mm, at least 1.5 mm, in a range of 0.5-1.5 mm, or in a range of 0.5-1 mm.

The support structure 1102 has a first, inner surface 1130 and a second, external surface 1132. The support structure 1102 is configured to function as a base support and backing of the input device. The support structure 1102 is configured to receive and process input (e.g., a key stroke) when an input key 1108 is pressed by a user.

The support structure 1102 may include one or more layers, such as those described above with reference to the example in FIG. 2. In certain examples, the thinness or height of the overall support structure 1102 (as measured along the z-axis) is less than 1 mm, less than 0.8 mm, less than 0.6 mm, less than 0.5 mm, in a range of 0.1-1 mm, in a range of 0.1-0.8 mm, in a range of 0.1-0.6 mm, in a range of 0.1-0.5 mm, in a range of 0.5-1 mm, in a range of 0.5-0.8 mm, in a range of 0.5-0.6 mm, in a range of 0.6-1 mm, or in a range of 0.6-0.8 mm.

The input device 1100 also includes a switch 1104 configured to be compressed when an input key 1108 is pressed toward the support structure 1102, to generate a signal based on the input key 1108 being pressed. The switch 1104 may be in the shape of a dome (i.e., a dome switch). In certain examples, a switch 1104 may be covered by a switch cover.

In certain examples, the combined thinness or height of the switch and switch cover (with a plunger included) (as measured along the z-axis) is less than 1.5 mm, less than 1.2 mm, less than 1.1 mm, less than 1 mm, in a range of 0.1-1.5 mm, in a range of 0.5-1.2 mm, in a range of 0.5-1.1 mm, or in a range of 1-1.2 mm.

The input device 1100 also includes a key plate 1106 having at least one key 1108, wherein each key 1108 is a polygon having a plurality of edges, wherein all but one edge of the plurality of edges is a slit or opening 1110 in the key plate 1106 and the one edge provides a hinge 1112 upon which the key is configured to rotate between a first position and a second position.

In certain examples, the thinness or height of the key plate with the hinged keys (as measured along the z-axis) is less than 0.2 mm, less than 0.15 mm, less than 0.1 mm, in a range of 0.01-0.2 mm, in a range of 0.05-0.15 mm, or in a range of 0.05-0.1 mm.

For example, as depicted in FIG. 11, the polygonal shaped key may be a rectangular-shaped or square-shaped key 1108. In such an example, three edges of the key are slits or openings 1110 in the key plate 1106. The remaining fourth edge 1112 of the key 1108 is the rotatable hinge. While a quadrilateral-shaped key is depicted in FIG. 11, other polygonal shaped keys are also possible such as a triangle, pentagon, hexagon, and so on.

The key plate 1106 may be made out of a material having some balance of flexibility and rigidity to maintain a flat surface while bending at the hinge of the input key 1108 when a force is applied. In some examples, the key plate 1106 is made of a thermoplastic polymer, a silicone, or a polyurethane. In other examples, the key plate 1106 is formed from a metallic composition. The metallic composition may include one or more metals or metal alloys such as aluminum, copper, iron, lead, magnesium, molybdenum, nickel, osmium, palladium, platinum, rhenium, rhodium, ruthenium, sliver, steel, tantalum, thorium, titanium, vanadium, or alloys thereof. In one example, the metallic composition is stainless steel.

The thinness or height of the key plate, as measured along the z-axis, is in a range of 0.01-0.5 mm, 0.01-0.2 mm, 0.01-0.1 mm, 0.05-0.2 mm, 0.5-0.1 mm, or 0.1-0.2 mm.

The width of the slits or openings 1110 surrounding the edges of the input key in the key plate is configurable. In some examples, the width of the slits or openings, as measured along the x- or y-axis perpendicular to the direction of the slit, is in a range of 1-1000 micrometers (μm), 1-100 μm, 1-10 μm, 10-100 μm, or 10-1000 μm.

Similar to the example described in FIG. 9, an input device with hinged keys may also be covered with a fabric cover and/or overlays.

Figure 12:
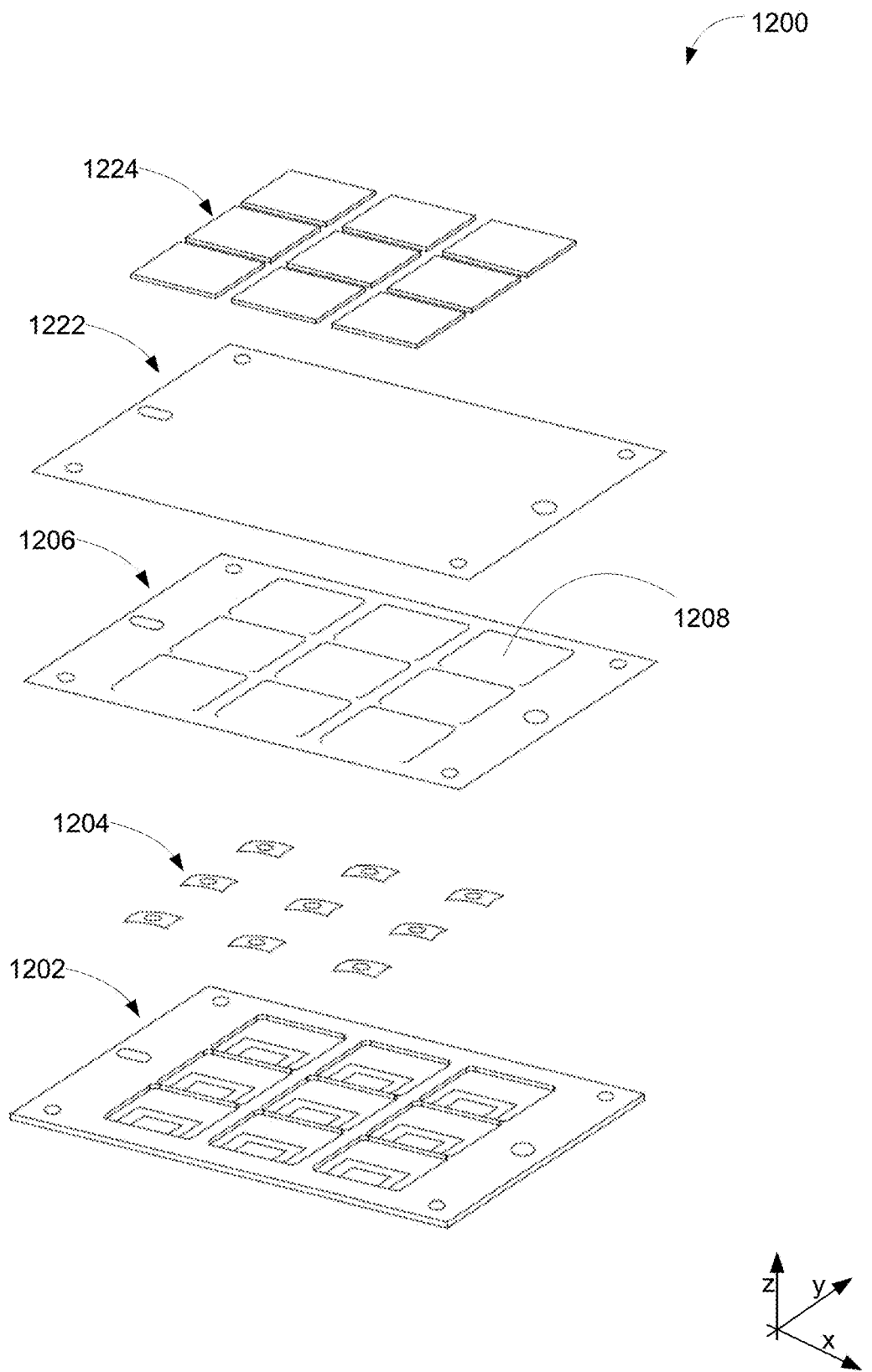
FIG. 12 depicts an exploded view of an exemplary input device having a hinged keyset and fabric cover.

FIG. 12 depicts an exploded view of an exemplary input device 1200 having a support structure 1202, dome switches 1204, a key plate 1206 with input keys 1208, a fabric cover 1222, and overlays 1224. As noted above, the fabric cover 1222 may be advantageous in protecting the internal components such as the dome switches 1204 or support structure from contamination or spills.

The fabric cover 1222 may be a polyurethane or microfiber fabric. In certain examples, the elasticity of the fabric cover 1222 does not affect the force required to move the input key 1208 between the first and second position and displace the dome switch 1204. In other examples, the elasticity of the fabric cover 1222 may affect the force displacement curve and snap ratio of the input device 1200. In such an example, it is advantageous to reduce or eliminate any negative user experience impact from the fabric cover 1222 by only adhering the fabric cover 1222 to the areas of the key plate 1206 surrounding the input keys 1208 and not to input keys 1208. In such an arrangement, the input key 1208, unbonded to the fabric cover 1222, may advantageously move between the first and second positions as if no fabric cover exists.

The overall thickness of the fabric cover 1222 is configurable. In certain examples, the thinness or height of the fabric cover 1222, as measured in the z-direction, may be in a range of 0.01-0.3 mm, 0.05-0.3 mm, 0.05-0.2 mm, 0.1-0.2 mm, 0.1-0.3 mm, or 0.2-0.3 mm.

In addition to the fabric cover 1222, individual overlays 1224 may be positioned on the outer surface of the fabric cover 1222 to identify the underlying, covered input keys 1208. The overlays 1224 may be formed in the shape of the underlying input keys 908. The overlays 1224 may be made of a fabric or polymer material such as a thermoplastic polymer, a silicone, or a polyurethane. The thinness or height of an overlay 1224, as measured in the z-direction, may be in a range of 0.01-0.5 mm, 0.1-0.5 mm, 0.2-0.5 mm, 0.3-0.5 mm, 0.1-0.3 mm, or 0.1-0.2 mm.

Figure 13:
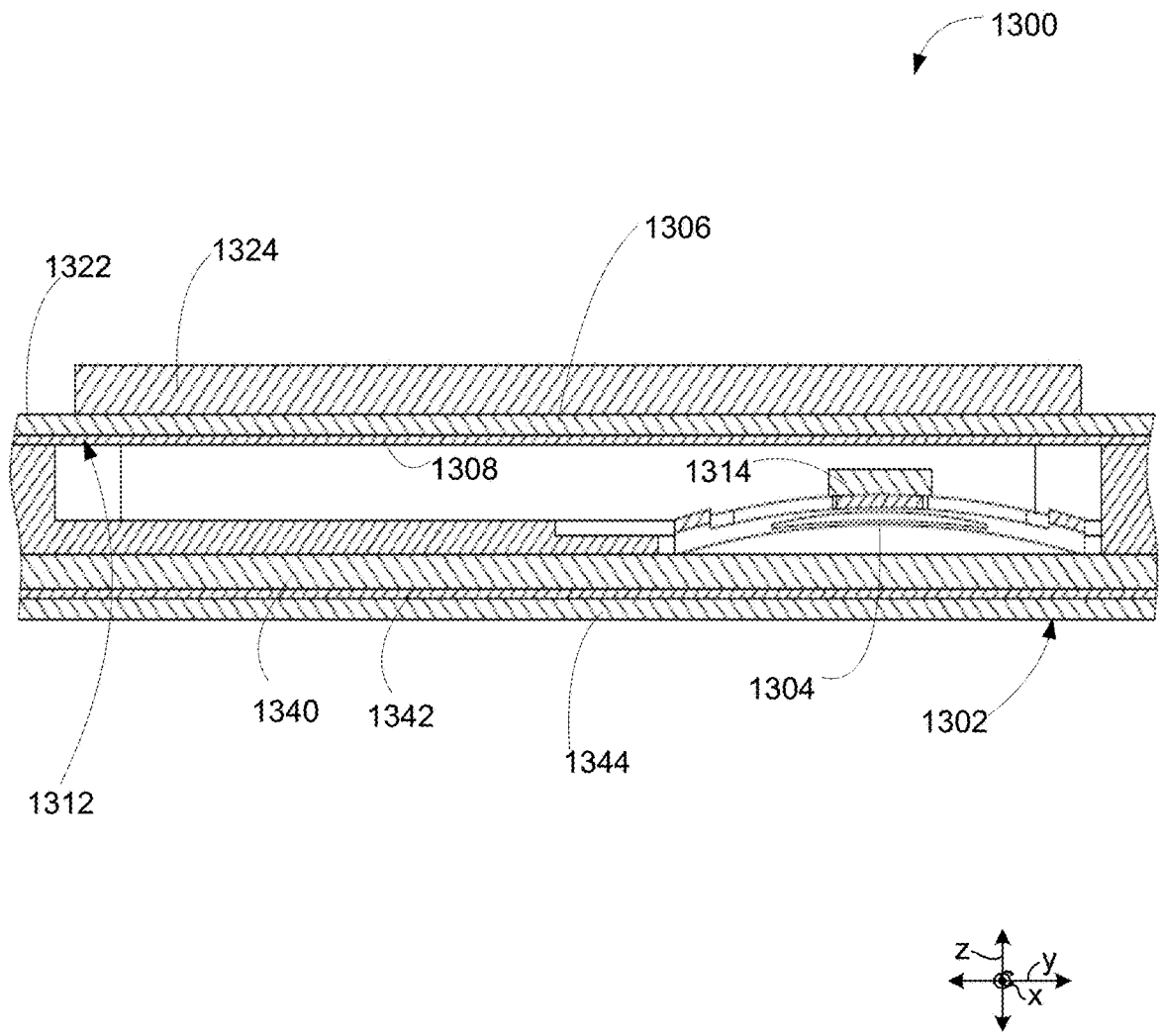
FIG. 13 depicts a cross-sectional side view of an exemplary input device with a hinged keyset and fabric cover.

FIG. 13 depicts a cross-sectional side view of an exemplary input device 1300 with a hinged keyset and fabric cover. The input device 1300 includes a support structure 1302 having a printed circuit board assembly 1340, a smoothing layer 1342, and a bottom fabric 1344. The input device also includes a switch (e.g., dome switch) 1304, and a key plate 1306 with an input key 1308. A plunger 1314 is positioned between the input key 1308 and the dome switch 1304. Additionally, a fabric cover 1322 and an overlay 1324 are provided.

The low-profile input device 1300 may have an overall stack height or z-height (e.g., as measured along the z-axis) for the combined layers of the input device 1300 of less than 2.5 mm, less than 2 mm, less than 1.8 mm, less than 1.5 mm, in a range of 1-2.5 mm, in a range of 1-2 mm, in a range of 1-1.8 mm, in a range of 1-1.5 mm, in a range of 1.5-2.5 mm, in a range of 1.8-2.5 mm, in a range of 1.5-2 mm, in a range of 1.5-1.8 mm, or in a range of 2-2.5 mm.

As depicted in FIG. 13, the hinge of the input key 1308 is positioned on the left side of the figure, such that a force applied to the input key 1308 would bend at the hinge 1312 and move the input key at the right side of the figure downward toward the dome switch 1304 and support structure 1302. In this arrangement, the dome switch 1304 is positioned in a location offset from a center of the respective key 1308, such that the dome switch 1304 is positioned adjacent to an edge of the plurality of edges of the respective key that is opposite from the hinge of the respective key. In other words, the dome switch 1304 is located closer to the right side of the area beneath the input key 1308, which is opposite from the location of the hinge 1312 on the left side.

Figure 14:
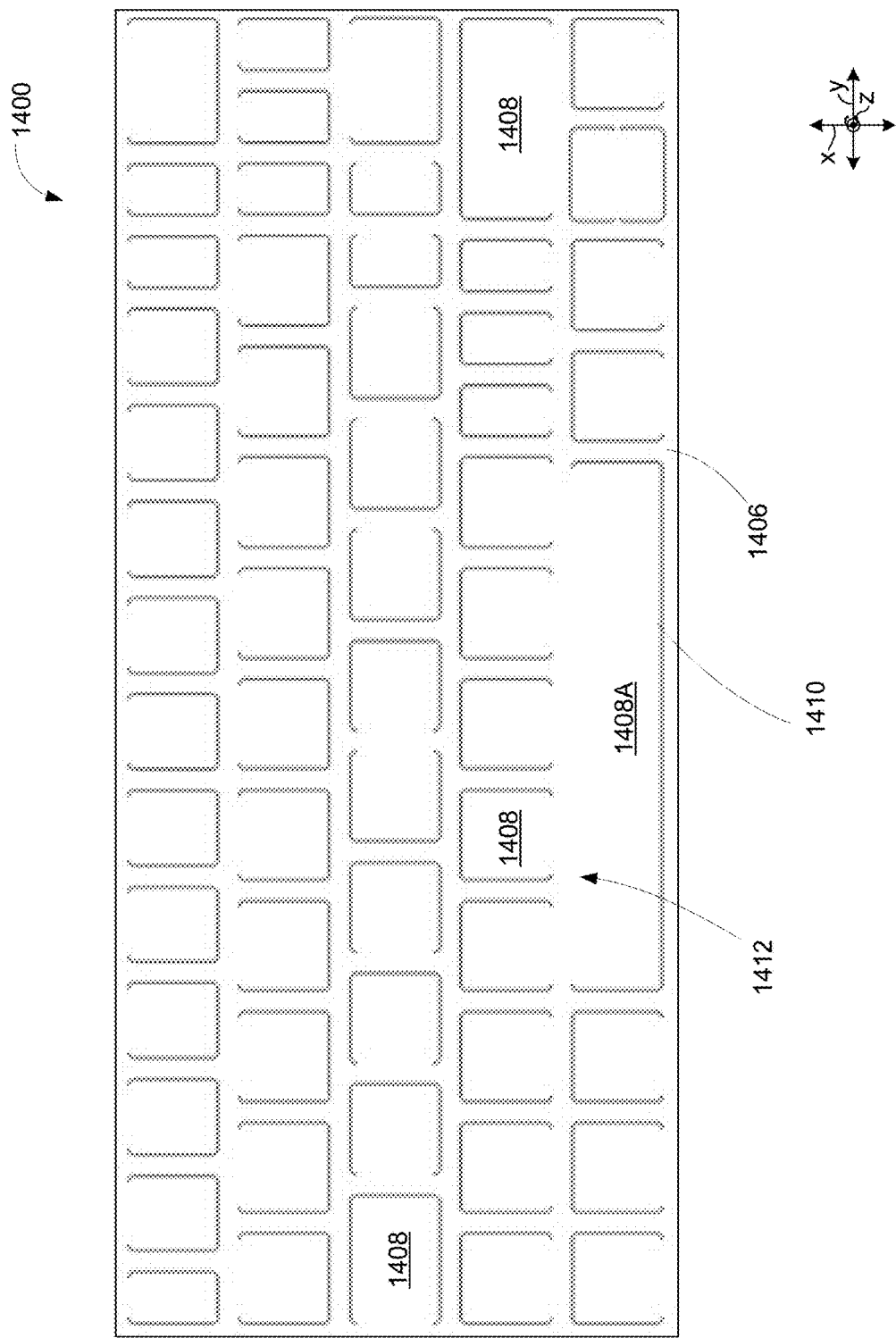
FIG. 14 depicts a top view of an example of a key plate having a plurality of hinged keys, and the orientation of the hinged keys.

FIG. 14 depicts a top view of an exemplary input device 1400 having a key plate 1406 with a plurality of hinged keys 1408. In certain examples, the orientation or location of the hinge on each key of the plurality of keys 1408 is configured based on an anticipated strike location by the user. In other words, the slits and hinges of each key may be arranged on the key plate to optimize the user's experience. Specifically, the hinge for an individual key may be arranged such that the hinge is positioned at an edge farthest from an expected strike location. The location for each hinge may be determined based upon studies identifying the most likely location for a user to strike the key.

For example, based upon the positioning of a user's hands over the key plate, it is anticipated that the user will strike the lower area of the space bar 1408A with one of the user's thumbs. As such, the slits or openings 1410 for the space bar 1408A are positioned on the bottom and side edges of the key, while the hinge 1412 for the space bar 1408A is positioned at the top edge of the key such that the space bar key bends or rotates about the hinge 1412. When the user strikes the lower area of the space bar 1408A, the user feels the space bar key travel a larger distance than if the user struck the space bar near the top of the key (as viewed along the x-axis). This larger travel distance may equate to a more enjoyable user experience.

Exemplary Computing Environment

Figure 15:
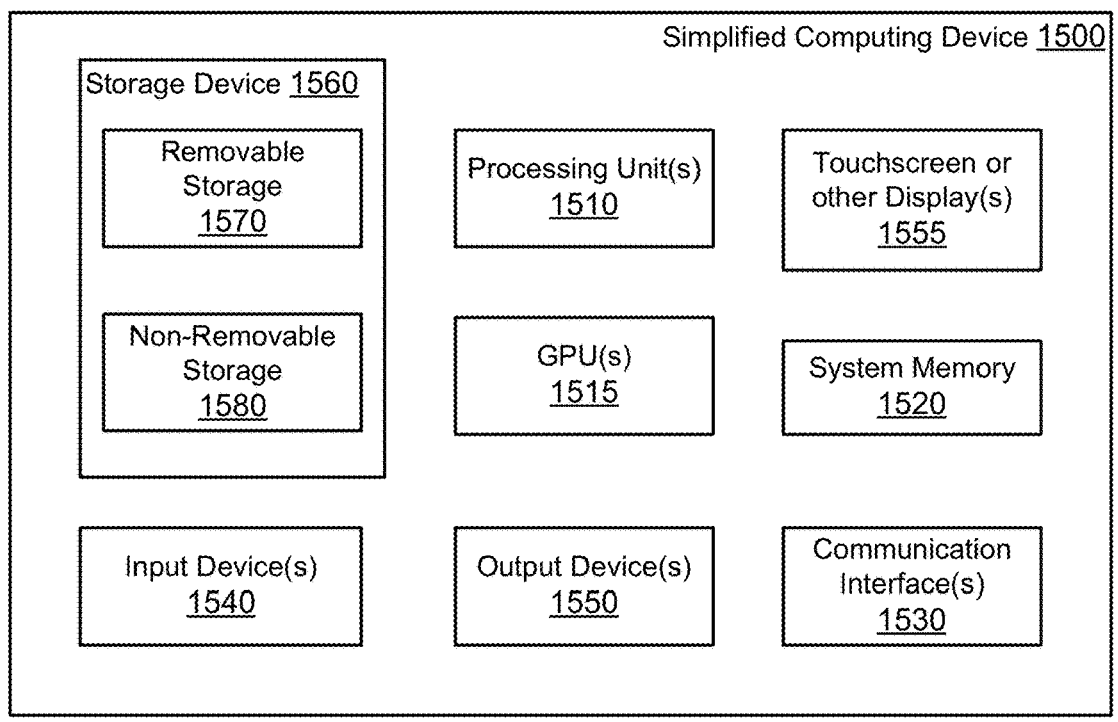
FIG. 15 is a block diagram of a computing environment in accordance with one example of a hybrid electronic device or a component of a hybrid electronic device described herein.

Regarding FIG. 15, the devices described above may be incorporated within an exemplary computing environment 1500. The computing environment 1500 may correspond with one of a wide variety of electronic or computing devices, including, but not limited to, personal computers (PCs), server computers, tablet and other handheld computing devices, laptop or mobile computers, communications devices such as mobile phones, multiprocessor systems, microprocessor-based systems, set top boxes, programmable consumer electronics, network PCs, minicomputers, mainframe computers, or audio or video media players. In certain examples, the computing device may be a wearable electronic device, wherein the device may be worn on or attached to a person's body or clothing. The wearable device may be attached to a person's shirt or jacket; worn on a person's wrist, ankle, waist, or head; or worn over their eyes or ears. Such wearable devices may include a watch, heart-rate monitor, activity tracker, or head-mounted display.

The computing environment 1500 has sufficient computational capability and system memory to enable basic computational operations. In this example, the computing environment 1500 includes one or more processing unit(s) 1510, which may be individually or collectively referred to herein as a processor. The computing environment 1500 may also include one or more graphics processing units (GPUs) 1515. The processor 1510 and/or the GPU 1515 may include integrated memory and/or be in communication with system memory 1520. The processor 1510 and/or the GPU 1515 may be a specialized microprocessor, such as a digital signal processor (DSP), a very long instruction word (VLIW) processor, or other microcontroller, or may be a general-purpose central processing unit (CPU) having one or more processing cores. The processor 1510, the GPU 1515, the system memory 1520, and/or any other components of the computing environment 1500 may be packaged or otherwise integrated as a system on a chip (SoC), application-specific integrated circuit (ASIC), or other integrated circuit or system.

The computing environment 1500 may also include other components, such as, for example, a communications interface 1530. One or more computer input devices 1540 (e.g., pointing devices, keyboards, audio input devices, video input devices, haptic input devices, or devices for receiving wired or wireless data transmissions) may be provided. The input devices 1540 may include one or more touch-sensitive surfaces, such as track pads. Various output devices 1550, including touchscreen or touch-sensitive display(s) 1555, may also be provided. The output devices 1550 may include a variety of different audio output devices, video output devices, and/or devices for transmitting wired or wireless data transmissions.

The computing environment 1500 may also include a variety of computer readable media for storage of information such as computer-readable or computer-executable instructions, data structures, program modules, or other data. Computer readable media may be any available media accessible via storage devices 1560 and includes both volatile and nonvolatile media, whether in removable storage 1570 and/or non-removable storage 1580. Computer readable media may include computer storage media and communication media. Computer storage media may include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which may be used to store the desired information, and which may be accessed by the processing units of the computing environment 1500.

While the present claim scope has been described with reference to specific examples, which are intended to be illustrative only and not to be limiting of the claim scope, it will be apparent to those of ordinary skill in the art that changes, additions and/or deletions may be made to the disclosed embodiments without departing from the spirit and scope of the claims.

The foregoing description is given for clearness of understanding only, and no unnecessary limitations should be understood therefrom, as modifications within the scope of the claims may be apparent to those having ordinary skill in the art.

Claim Support Section

In a first embodiment, an input device includes: a support structure having a first surface and a second surface, the support structure comprising at least one cavity in the first surface; a bezel having a first surface and a second surface, wherein the first surface of the bezel is adjacent to the first surface of the support structure, and wherein the bezel comprises at least one opening; and at least one key cap positioned within the at least one opening of the bezel, wherein each key cap is configured to move between a first position and a second position to trigger a function of the input device, wherein each key cap has at least one flange positioned between the first surface of the bezel and the first surface of the support structure, and wherein the at least one flange of each key cap is configured to move into a respective cavity in the first surface of the support structure when the respective key cap is moved from the first position to the second position.

In a second embodiment, an input device includes: a support structure; a key plate having at least one key, wherein each key is a polygon having a plurality of edges, wherein all but one edge of the plurality of edges is a slit in the key plate and the one edge provides a hinge upon which the key is configured to rotate between a first position and a second position; and at least one switch positioned between the support structure and the key plate, wherein the at least one switch is configured to trigger a function of the input device when the key rotates from the first position to the second position.

In a third embodiment, an input device includes: a support structure; at least one input key; and at least one switch positioned between the support structure and the input key, wherein the at least one switch is configured to trigger a function of the input device when the input key moves between a first position and a second position, wherein a stack height of the input device is less than 2.5 mm, as measured in a direction from a surface of the input key to the support structure, perpendicular to the surface of the input key, and wherein a travel distance of the input key between the first position and the second position is at least 0.5 mm, as measured in the direction from the surface of the input key to the support structure, perpendicular to the surface of the key plate.

In a fourth embodiment, with reference to any of embodiments 1-3, the input device further includes: at least one switch positioned on the first surface of the support structure; and at least one plunger positioned between the at least one key or key cap and the at least one switch, wherein the plunger is configured to compress when the key or key cap is moved from the first position to the second position.

In a fifth embodiment, with reference to the fourth embodiment, the at least one plunger comprises an elastomeric material.

In a sixth embodiment, with reference to any of embodiments 1-5, the at least one key cap is a metallic key cap.

In a seventh embodiment, with reference to the sixth embodiment, the input device further includes a paint layer positioned on a surface of the at least one metallic key cap, such that the metallic key cap is positioned between the paint layer and the support structure.

In an eighth embodiment, with reference to any of embodiments 1-7, the input device further includes a fabric cover layer positioned adjacent to the second surface of the bezel or a surface of the key plate, such that the bezel or key plate is positioned between the fabric cover layer and the support structure.

In a ninth embodiment, with reference to the eighth embodiment, the fabric cover layer is only adhered to the second surface of the bezel or the key plate in areas surrounding the at least one key.

In a tenth embodiment, with reference to the eighth or ninth embodiment, the input device further includes at least one overlay attached to the fabric cover layer such that the fabric cover layer is positioned between the at least one overlay and the bezel or key plate, wherein the at least one overlay provides a visual indication of a key or key cap location hidden beneath the fabric cover layer.

In an eleventh embodiment, with reference to any of embodiments 1-10, a stack height of the input device is less than 2.5 mm, as measured in a direction from the second surface of the bezel to the support structure, perpendicular to the second surface of the bezel.

In a twelfth embodiment, with reference to any of embodiments 1-11, a key cap travel distance between the first position and the second position is at least 0.5 mm, as measured in a direction from a surface of the key cap to the support structure, perpendicular to the surface of the key cap.

In a thirteenth embodiment, with reference to any of embodiments 1-12, the at least one switch is positioned in a location offset from a center of the respective key, such that the switch is positioned adjacent to an edge of the plurality of edges of the respective key that is opposite from the hinge of the respective key.

In a fourteenth embodiment, with reference to any of embodiments 1-13, the at least one key is a plurality of keys, and wherein slits and hinges in the key plate are arranged based on a user's expected strike location for each key, such that a hinge is positioned at an edge farthest from the expected strike location.

In a fifteenth embodiment, with reference to any of embodiments 1-14, the input device further includes a bezel having a first surface and a second surface, wherein the first surface of the bezel is adjacent to a surface of the support structure, and wherein the bezel comprises at least one opening, wherein the support structure has at least one cavity in the surface of the support structure, wherein the at least one input key is positioned within the at least one opening of the bezel, wherein each input key has at least one flange positioned between the first surface of the bezel and the surface of the support structure, and wherein the at least one flange of each input key is configured to move into a respective cavity in the surface of the support structure when the respective key cap is moved from the first position to the second position.

In a sixteenth embodiment, with reference to any of embodiments 1-15, the input device further includes a key plate having the at least one input key, wherein each input key is a polygon having a plurality of edges, wherein all but one edge of the plurality of edges is a slit in the key plate and the one edge provides a hinge upon which the key is configured to rotate between the first position and the second position.

What is claimed is:

1. An input device comprising:
   a support structure having a first surface and a second surface;
   a bezel having a first surface and a second surface, wherein the first surface of the bezel is adjacent to the first surface of the support structure, and wherein the bezel comprises at least one opening;
   at least one key cap positioned within the at least one opening of the bezel, wherein each key cap is configured to move between a first position and a second position to trigger a function of the input device; and
   a fabric cover layer positioned adjacent to the second surface of the bezel, such that the bezel and the at least one key cap are positioned between the fabric cover layer and the support structure, wherein the fabric cover layer is only adhered to the second surface of the bezel and not the at least one key cap.

2. The input device of claim 1, wherein the support structure comprises at least one cavity in the first surface, and
   wherein each key cap has at least one flange positioned between the first surface of the bezel and the first surface of the support structure, and wherein the at least one flange of each key cap is configured to move into a respective cavity in the first surface of the support structure when the respective key cap is moved from the first position to the second position.

3. The input device of claim 1, further comprising:
   at least one switch positioned on the first surface of the support structure; and
   at least one plunger positioned between the at least one key cap and the at least one switch, wherein the plunger is configured to compress when the key cap is moved from the first position to the second position.

4. The input device of claim 3, wherein the at least one plunger comprises an elastomeric material.

5. The input device of claim 1, wherein the at least one key cap is a metallic key cap.

6. The input device of claim 1, further comprising:
   at least one overlay attached to the fabric cover layer such that the fabric cover layer is positioned between the at least one overlay and the bezel,
   wherein the at least one overlay provides a visual indication of a key cap location hidden beneath the fabric cover layer.

7. The input device of claim 1, wherein a stack height of the input device is less than 2.5 mm, as measured in a direction from the second surface of the bezel to the support structure, perpendicular to the second surface of the bezel, and
   wherein a key cap travel distance between the first position and the second position is at least 0.5 mm, as measured in a direction from a surface of the key cap to the support structure, perpendicular to the surface of the key cap.

8. The input device of claim 1, further comprising:
   at least one switch positioned between the support structure and the at least one key cap, wherein the at least one switch is configured to trigger a function of the input device when the at least one key cap rotates from the first position to the second position.

9. The input device of claim 8, further comprising:
   at least one plunger positioned between the at least one key cap and the at least one switch, wherein the plunger is configured to compress when the at least one key cap is moved from the first position to the second position.

10. The input device of claim 9, wherein the at least one plunger comprises an elastomeric material.

11. The input device of claim 8, wherein the at least one switch is positioned in a location offset from a center of the respective at least one key cap, such that the switch is positioned adjacent to an edge of the plurality of edges of the respective at least one key cap that is opposite from a hinge of the respective at least one key cap.

12. The input device of claim 8, further comprising:
   the fabric cover layer positioned adjacent to a surface of the at least one key cap.

13. The input device of claim 12, further comprising:
   at least one overlay attached to the fabric cover layer, wherein the at least one overlay provides a visual indication of a key location hidden beneath the fabric cover layer.

14. The input device of claim 8, wherein a stack height of the input device is less than 2.5 mm, as measured in a direction from a surface of the at least one key cap to the support structure, perpendicular to the surface of the at least one key cap.

15. The input device of claim 8, wherein a key travel distance between the first position and the second position is at least 0.5 mm, as measured in a direction from a surface of the at least one key cap to the support structure, perpendicular to the surface of the at least one key cap.

16. The input device of claim 1, further comprising:
   at least one switch positioned between the support structure and the at least one key cap, wherein the at least one switch is configured to trigger a function of the input device when the at least one key cap moves between the first position and the second position,
   wherein a stack height of the input device is less than 2.5 mm, as measured in a direction from a surface of the at least one key cap to the support structure, perpendicular to the surface of the at least one key cap, and
   wherein a travel distance of the at least one key cap between the first position and the second position is at least 0.5 mm, as measured in the direction from the surface of the at least one key cap to the support structure, perpendicular to the surface of the at least one key cap.

17. The input device of claim 16, wherein the at least one key cap is a metallic key cap.

18. The input device of claim 17, further comprising:
   a paint layer positioned on a surface of the at least one metallic key cap, such that the metallic key cap is positioned between the paint layer and the support structure.

19. An input device comprising:
   a support structure having a first surface and a second surface, the support structure comprises at least one cavity in the first surface;
   a bezel having a first surface and a second surface, wherein the first surface of the bezel is adjacent to the first surface of the support structure, and wherein the bezel comprises at least one opening;
   at least one key cap positioned within the at least one opening of the bezel, wherein each key cap is configured to move between a first position and a second position to trigger a function of the input device, and each key cap has at least one flange positioned between the first surface of the bezel and the first surface of the support structure, and the at least one flange of each key cap is configured to move into a respective cavity in the first surface of the support structure when the respective key cap is moved from the first position to the second position;
   wherein a stack height of the input device is less than 2.5 mm, as measured in a direction from the second surface of the bezel to the support structure, perpendicular to the second surface of the bezel, and
   wherein a key cap travel distance between the first position and the second position is at least 0.5 mm, as measured in a direction from a surface of the key cap to the support structure, perpendicular to the surface of the key cap.

20. An input device comprising:
   a support structure having a first surface and a second surface, the support structure comprises at least one cavity in the first surface;
   a bezel having a first surface and a second surface, wherein the first surface of the bezel is adjacent to the first surface of the support structure, and wherein the bezel comprises at least one opening;

at least one key cap positioned within the at least one opening of the bezel, wherein each key cap is configured to move between a first position and a second position to trigger a function of the input device, wherein the at least one key cap is a metallic key cap, and each key cap has at least one flange positioned between the first surface of the bezel and the first surface of the support structure, and the at least one flange of each key cap is configured to move into a respective cavity in the first surface of the support structure when the respective key cap is moved from the first position to the second position;

at least one switch positioned on the first surface of the support structure;

at least one plunger positioned between the at least one key cap and the at least one switch, wherein the plunger is configured to compress when the key cap is moved from the first position to the second position, wherein the at least one plunger comprises an elastomeric material; and a fabric cover layer positioned adjacent to the second surface of the bezel, such that the bezel and the at least one key cap are positioned between the fabric cover layer and the support structure, wherein the fabric cover layer is only adhered to the second surface of the bezel and not the at least one key cap;

at least one overlay attached to the fabric cover layer such that the fabric cover layer is positioned between the at least one overlay and the bezel, wherein the at least one overlay provides a visual indication of a key cap location hidden beneath the fabric cover layer, wherein a stack height of the input device is less than 2.5 mm, as measured in a direction from the second surface of the bezel to the support structure, perpendicular to the second surface of the bezel, and wherein a key cap travel distance between the first position and the second position is at least 0.5 mm, as measured in a direction from a surface of the key cap to the support structure, perpendicular to the surface of the key cap.

* * * * *